US011710581B2

(12) United States Patent
Yamaki et al.

(10) Patent No.: US 11,710,581 B2
(45) Date of Patent: Jul. 25, 2023

(54) TRANSPARENT CONDUCTING FILM LAMINATE AND PROCESSING METHOD THEREOF

(71) Applicant: SHOWA DENKO K.K., Tokyo (JP)

(72) Inventors: Shigeru Yamaki, Tokyo (JP); Shuhei Yoneda, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/615,429

(22) PCT Filed: Dec. 24, 2019

(86) PCT No.: PCT/JP2019/050513
§ 371 (c)(1),
(2) Date: Nov. 30, 2021

(87) PCT Pub. No.: WO2020/255458
PCT Pub. Date: Dec. 24, 2020

(65) Prior Publication Data
US 2022/0230774 A1    Jul. 21, 2022

(30) Foreign Application Priority Data

Jun. 20, 2019   (JP) .............................. JP2019-114964

(51) Int. Cl.
| H01B 1/22 | (2006.01) |
| B32B 27/08 | (2006.01) |
| B32B 27/32 | (2006.01) |
| B32B 27/36 | (2006.01) |
| C09J 7/29 | (2018.01) |
| C09D 163/00 | (2006.01) |
| C09D 175/04 | (2006.01) |
| H01B 5/14 | (2006.01) |

(52) U.S. Cl.
CPC .............. *H01B 1/22* (2013.01); *B32B 27/08* (2013.01); *B32B 27/32* (2013.01); *B32B 27/36* (2013.01); *B32B 2250/02* (2013.01); *B32B 2250/24* (2013.01); *B32B 2255/10* (2013.01); *B32B 2255/205* (2013.01); *B32B 2255/26* (2013.01); *B32B 2255/28* (2013.01); *B32B 2307/202* (2013.01); *B32B 2307/412* (2013.01); *B32B 2307/732* (2013.01); *B32B 2457/208* (2013.01)

(58) Field of Classification Search
None
See application file for complete search history.

(56) References Cited

U.S. PATENT DOCUMENTS

| 2010/0136276 A1 | 6/2010 | Andou et al. | |
| 2015/0103269 A1 | 4/2015 | Suganuma et al. | |
| 2021/0064164 A1* | 3/2021 | Inou ...................... | B32B 27/281 |
| 2022/0371310 A1* | 11/2022 | Yamaki ................. | B32B 27/325 |

FOREIGN PATENT DOCUMENTS

| CN | 103518239 A | 1/2014 |
| CN | 104718580 A | 6/2015 |
| CN | 107000398 A | 8/2017 |
| CN | 107000409 A | 8/2017 |
| CN | 107107576 A | 8/2017 |
| JP | 2003-205567 A | 7/2003 |
| JP | 2008-251529 A | 10/2008 |
| JP | 2014-191894 A | 10/2014 |
| JP | 2016-030374 A | 3/2016 |
| JP | 2016-032935 A | 3/2016 |
| JP | 2016-052775 A | 4/2016 |
| JP | 2016-107503 A | 6/2016 |
| JP | 2016-107504 A | 6/2016 |
| JP | 2016-173714 A | 9/2016 |
| JP | 2016-210974 A | 12/2016 |
| JP | 2017-130419 A | 7/2017 |
| JP | 2018-060607 A | 4/2018 |
| JP | 2018-164985 A | 10/2018 |
| JP | 2019-89341 A | 6/2019 |
| JP | 2019-149012 A | 9/2019 |
| TW | 201824298 A | 12/2016 |
| WO | 2008/046058 A2 | 4/2008 |
| WO | 2013/161997 A1 | 10/2013 |
| WO | 2016/088808 A1 | 6/2016 |
| WO | 2016/088809 A1 | 6/2016 |
| WO | 2016/104204 A1 | 6/2016 |
| WO | 2019/131679 A1 | 7/2019 |

OTHER PUBLICATIONS

International Search Report for PCT/JP2019/050513 dated Mar. 24, 2020 [PCT/ISA/210].
Written Opinion for PCT/JP2019/050513 dated Mar. 24, 2020 [PCT/ISA/237].

* cited by examiner

*Primary Examiner* — Sheeba Ahmed
(74) *Attorney, Agent, or Firm* — Sughrue Mion, PLLC

(57) ABSTRACT

Provided are a transparent conducting film laminate to which a curl generated during a heating step and after the heating step can be controlled, and a method for processing the same. A transparent conducting film laminate comprises a transparent conducting film 20 and a carrier film 10 stacked thereon, wherein the transparent conducting film 20 comprises a transparent resin film 3, transparent conducting layer 4, and an overcoat layer 5 stacked in this order, the transparent resin film 3 having a thickness $T_1$ of 5 to 25 μm and being made of an amorphous cycloolefin-based resin, the carrier film 10 is releasably stacked on the other main face, the face opposite to the face having the transparent conducting layer 4, of the transparent resin film 3 with an adhesive agent layer 2 therebetween, and a protection film 1 has a thickness $T_2$ which is 5 times or more of the thickness $T_1$ of the transparent resin film 3 and is 150 μm or less, and is made of polyester having an aromatic ring in its molecular backbone.

9 Claims, 6 Drawing Sheets

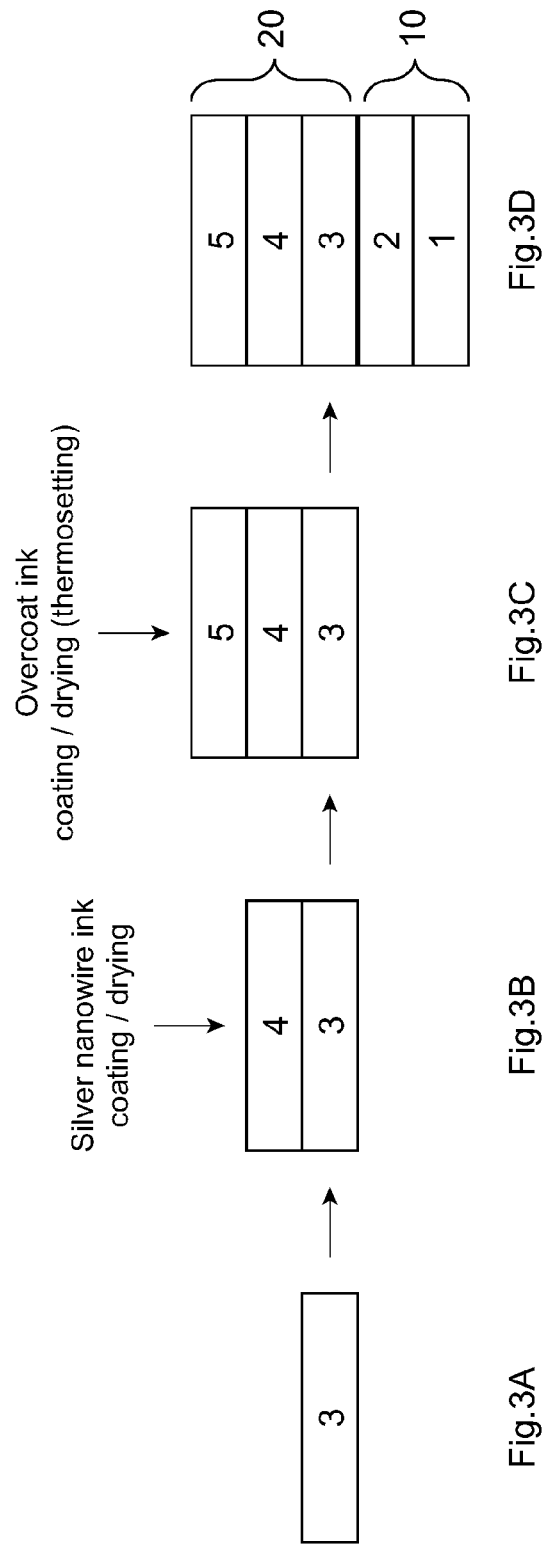

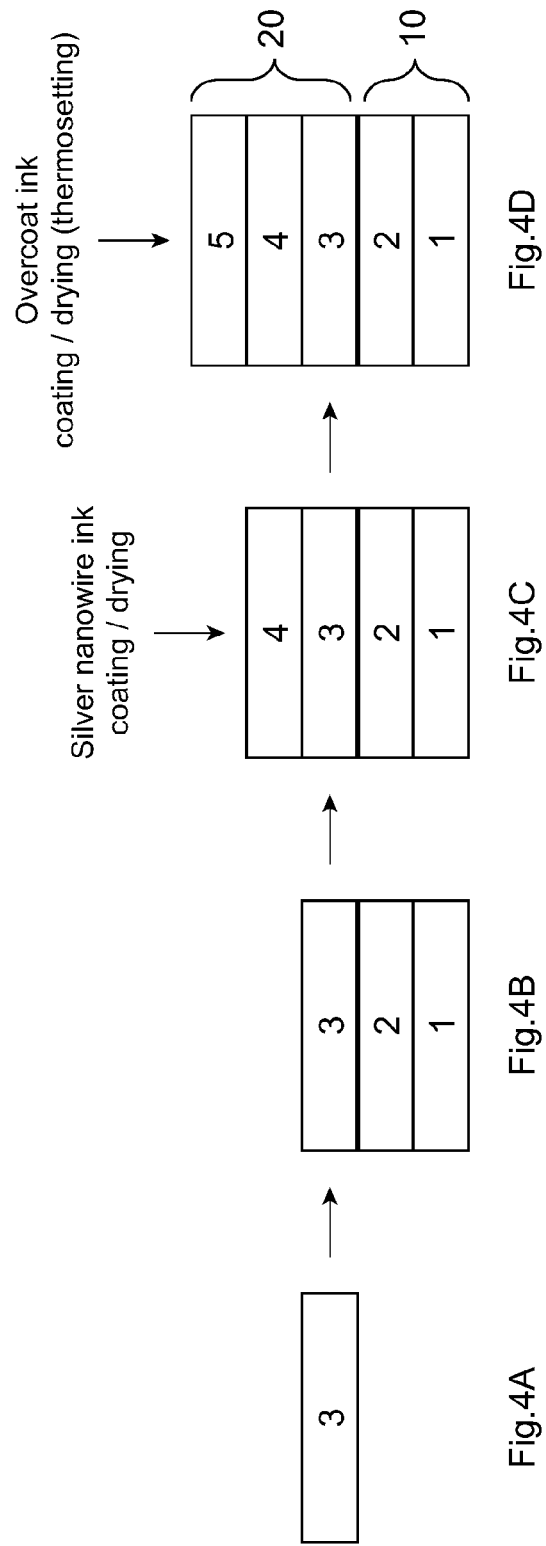

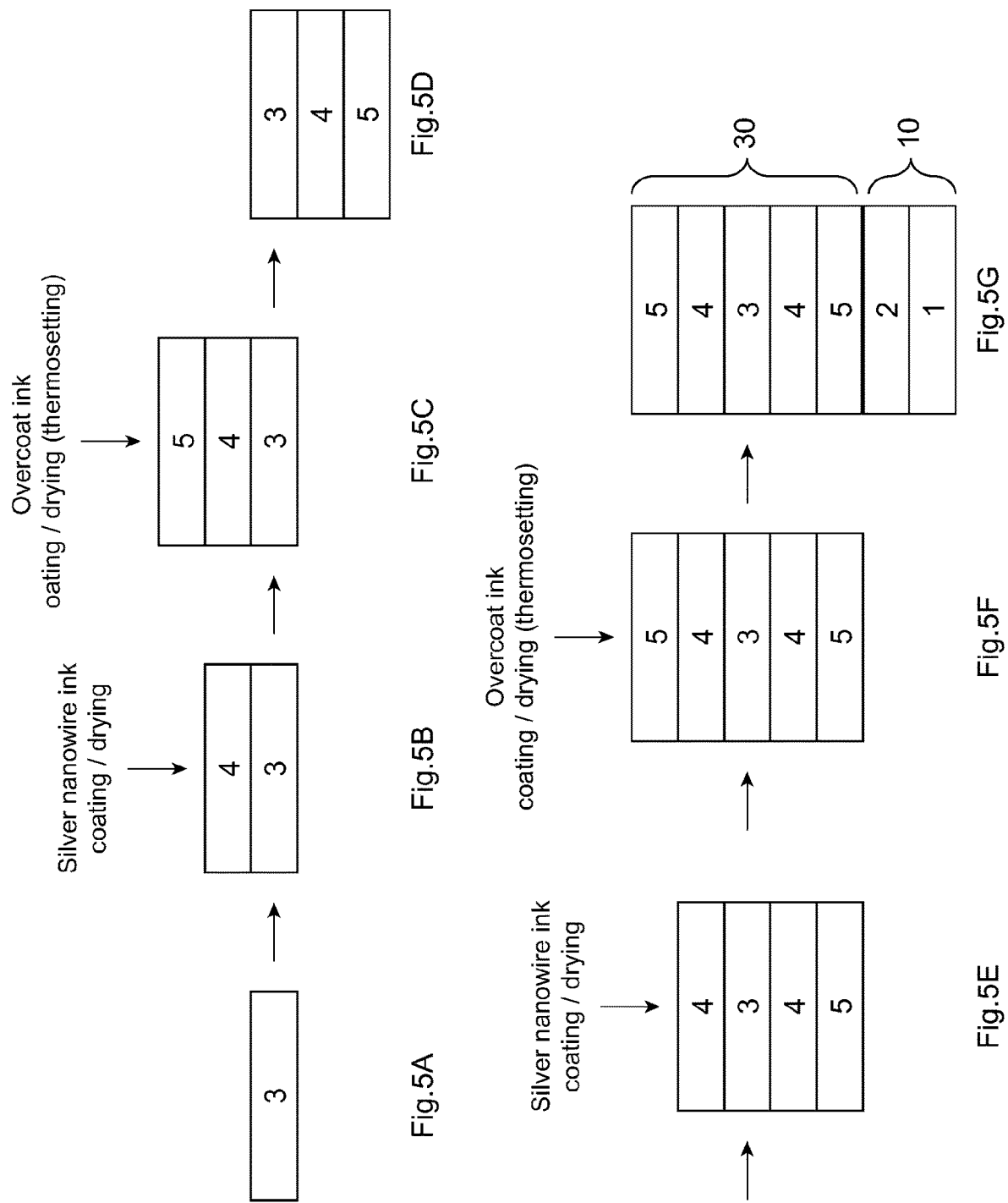

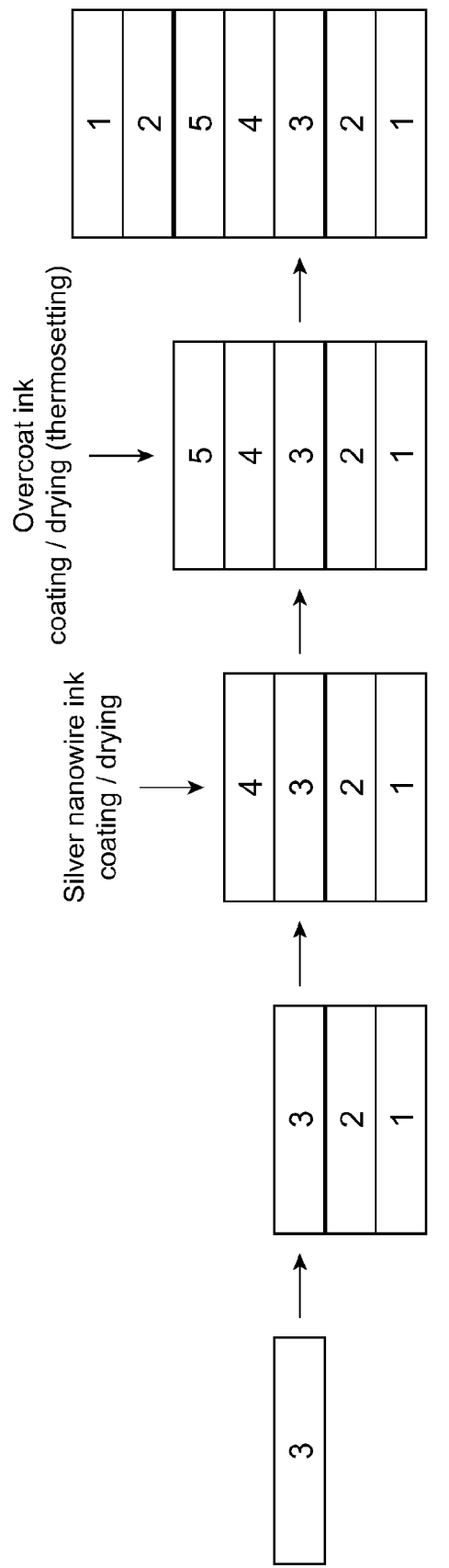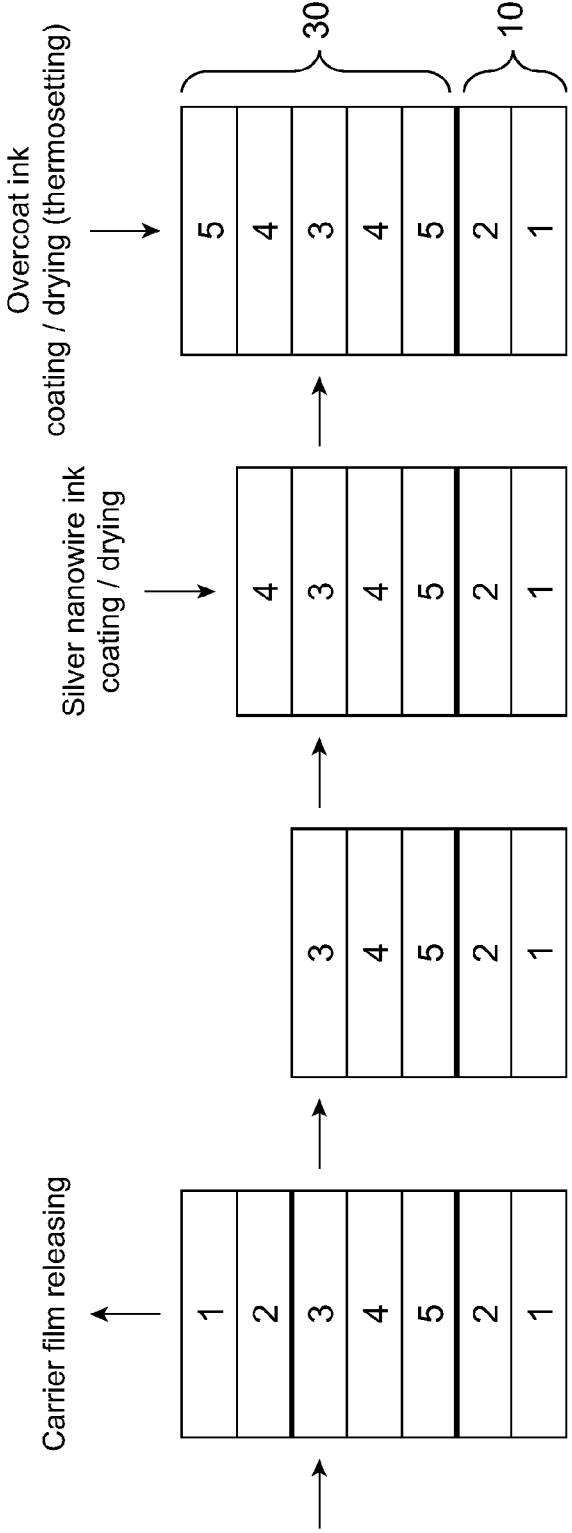

US 11,710,581 B2

TRANSPARENT CONDUCTING FILM LAMINATE AND PROCESSING METHOD THEREOF

Cross Reference To Related Applications

This application is a National Stage of International Application No. PCT/JP2019/050513 filed Dec. 24, 2019, claiming priority based on Japanese Patent Application No. 2019-114964 filed Jun. 20, 2019.

TECHNICAL FIELD

The present disclosure relates to a transparent conducting film laminate and a processing method thereof, and specifically relates to a transparent conducting film laminate useful for preventing a curl generated during a heating step, and a processing method thereof.

BACKGROUND ART

Conventionally, a polyethylene terephthalate (PET) film has been widely used as a substrate film for a transparent conducting film which constitutes an electrostatic capacitance type touch panel. However, a PET film has high birefringence because of the biaxial stretching applied when formed into a film, and thus, a phase difference occurs when an incident linearly polarized light passes through the PET film. Therefore, using the PET film under a polarization plate is difficult. Thus, a transparent conducting film using a cycloolefin-based resin is used as a substrate film for low phase difference.

Further, recently, touch panels are adopted for smartphones, car navigation systems, vending machines, etc. In particular, since a foldable smartphone attracts attention, there is a desire for a foldable touch panel. Accordingly, a transparent conducting film using a very thin substrate film has been desired.

In general, when a transparent conducting film is produced by forming a conducting layer and a protective layer (overcoat layer) on a substrate film, a protective film should be adhered on the rear face to form a laminate body, in order to prevent damages on the substrate during transportation.

Patent Document 1 discloses a laminate body of a substrate film made of a transparent conducting film, and a surface protection film (release film), both of the substrate film and the surface protection being PET films. By adjusting heat shrinkage ratios of the transparent conducting film provided with an amorphous transparent conducting thin film (ITO film), and the protection film (release film), curl reduction is achieved.

However, there are no descriptions nor suggestions of using a cycloolefin-based resin for the substrate film.

Patent Document 2 discloses a transparent conducting film laminate which includes a carrier film having a protection film and an adhesive layer provided on at least one face of the protection film, and a transparent conducting film having a transparent resin film and a transparent conducting film, releasably stacked on the carrier film with the adhesive layer therebetween, and the transparent resin film is formed of an amorphous cycloolefin-based resin, and the protection film is formed of an amorphous resin which is different from the resin forming the transparent resin film and has a glass transition temperature of 130° C. or higher. By adjusting the glass transition temperatures and thicknesses of the transparent resin film and the protection film, curl reduction during heating is achieved. However, there no descriptions nor suggestions of using a thin transparent resin film and a PET protection film.

PRIOR ARTS

Patent Document 1: Japanese Unexamined Patent Publication (Kokai) No. 2008-251529
Patent Document 2: Japanese Unexamined Patent Publication (Kokai) No. 2016-107503

SUMMARY

In a transparent conducting film, when a cycloolefin-based resin film is used for a substrate film, and a PET film is used for a protection film, due to the difference in heat shrinkage ratio, linear expansion coefficient, etc., curl (warpage) tends to occur during a heating process, or after heating/cooling. As a result, there are drawbacks that when transparent conducting film laminates are processed and conveyed, the warped transparent conducting film laminates may be in contact with the upper portion or a lower portion of a drying furnace. Thus, stable and continuous production becomes difficult.

During a process of producing touch panels using transparent conducting film laminates, there are a step of printing a wiring part with silver paste, etc., by screen printing, and a step of heating to dry and/or thermally-cure the printed silver paste. In the heating step, if the transparent conducting film laminates are curled (warped), there are drawbacks that silver paste cannot be uniformly dried and/or thermally-cured or pattern accuracy becomes worse, leading to decreasing the yield of the touch panel production.

Further, if curl (warpage) is present after the heating, positional deviation occurs when the film laminate is adhered to a cover glass or other electrode film, and thus, production of touch panels becomes difficult.

Also, in a transparent conducting film, when a cycloolefin-based resin film of 25 µm or less is used for a substrate film, and a cycloolefin-based resin film is used for a protection film, unless the protection film is thick to some extent, handling when bonding the films, etc., is difficult, and thus, the transparent conducting film laminates become very expensive.

Both of Patent Document 1 and Patent Document 2 present problems regarding curls remaining after the heating and cooling, but are silent regarding suppression of the curl occurrence during the heating.

One of the objectives of the present disclosure is providing a transparent conducting film laminate and a processing method therefor, capable of suppressing curling of the transparent conducting film laminate during the heating step and after the heating step and capable of ensuring yields in the subsequent steps, when a thin cycloolefin-based resin film is used for a substrate of the transparent conducting film.

The present disclosure includes the following aspects.

[1] A transparent conducting film laminate comprising a carrier film and a transparent conducting film stacked on the carrier film, wherein the carrier film comprises a protection film which is provided, on one of the main faces thereof, with an adhesive agent layer, the transparent conducting film comprises a transparent resin film which is provided, on one or both of the main faces thereof, with a transparent conducting layer containing metal nanowires and a binder resin, and an overcoat layer, stacked in this order, the transparent resin film is made of an amorphous cycloolefin-based resin, and has a thickness $T_1$ of 5 to 25 μm, the transparent conducting film laminate is constituted by providing the transparent conducting film to be releasably stacked on the adhesive agent layer of the carrier film so that the overcoat layer becomes the outermost layer, and, the protection film is made of polyester having an aromatic ring in its molecular backbone, and the protection film has a thickness $T_2$ which is 5 times or more of the thickness $T_1$ of the transparent resin film, and is 150 μm or less.

[2] A transparent conducting film laminate according to [1], wherein the transparent conducting layer containing the metal nanowires and the binder resin, and the overcoat layer are stacked, in this order, on one of the main faces of the transparent resin film.

[3] A transparent conducting film laminate according to [1], wherein the transparent conducting layer containing the metal nanowires and the binder resin, and the overcoat layer are stacked, in this order, on each of the opposite main faces of the transparent resin film.

[4] A transparent conducting film laminate according to any one of [1] to [3], wherein the protection film is made of a polyethylene terephthalate-based resin.

[5] A transparent conducting film laminate according to any one of [1] to [4], wherein the metal nanowire contained in the transparent conducting layer is a silver nanowire.

[6] A method for processing a transparent conducting film laminate comprising a step of thermal-processing the transparent conducting film laminate according to any one of [1] to [5], and a step of releasing a carrier film from a transparent conducting film of the transparent conducting film laminate.

[7] A method for processing a transparent conducting film laminate according to [6], wherein the thermal-processing step is a step of forming a conducting pattern by drying and/or thermosetting a conductive paste pattern formed on the overcoat layer with a conductive paste.

According to the present disclosure, a transparent conducting film laminate and a processing method therefor, capable of suppressing curling of the transparent conducting film laminate during the heating step and after the heating step and capable of ensuring yields in the subsequent steps, can be provided, when a thin cycloolefin-based resin film is used for a substrate of the transparent conducting film.

BRIEF DESCRIPTION OF DRAWINGS

FIGS. 3A to 3D are a process chart showing a production method for the transparent conducting film laminate according to the first aspect.

FIGS. 4A to 4D are a process chart showing a modified example of a production method for the transparent conducting film laminate according to the first aspect.

FIGS. 5A to 5G are a process chart showing a production method for the transparent conducting film laminate according to the second aspect.

FIGS. 6A to 6I are a process chart showing a modified example of a production method for the transparent conducting film laminate according to the second aspect.

ASPECT OF DISCLOSURE

Hereinbelow, aspects of the present disclosure (hereinbelow, referred to as aspects) will be explained with reference to the drawings.

Figure 1:
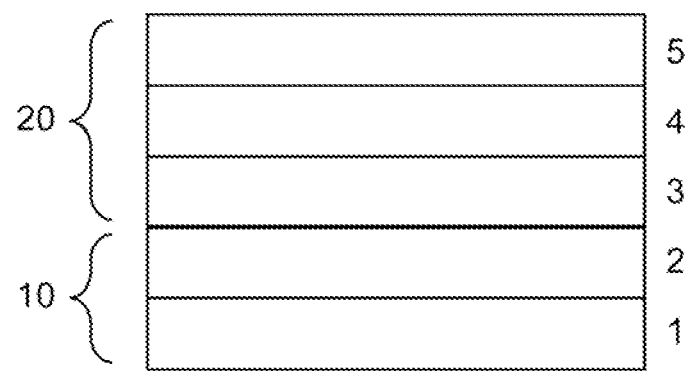
FIG. 1 is a schematic cross-sectional view of a transparent conducting film laminate according to the first aspect of the present disclosure.
Figure 2:
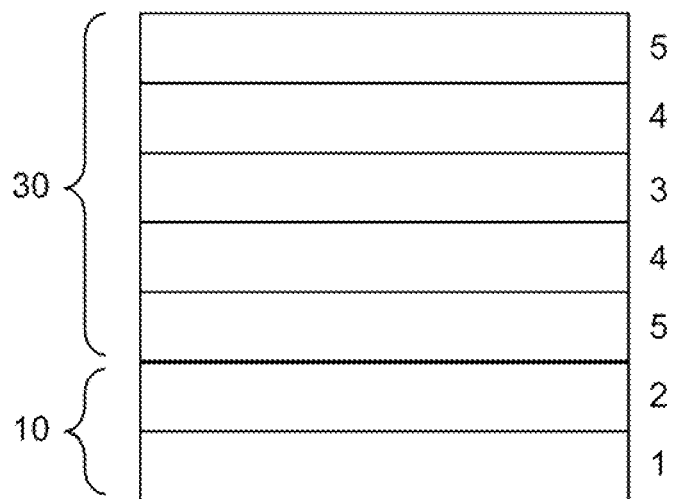
FIG. 2 is a schematic cross-sectional view of a transparent conducting film laminate according to the second aspect of the present disclosure.

A transparent conducting film laminate according to the present disclosure includes a carrier film 10 and a transparent conducting film 20 or 30 stacked on the carrier film 10. The carrier film 10 is provided with a protection film 1, and an adhesive agent layer 2 provided on one main face of the protection film 1. The transparent conducting film 20 includes a transparent resin film 3 provided on one main face with a transparent conducting layer 4 containing metal nanowires and a binder resin, and an overcoat layer 5, stacked in this order. The transparent conducting film 30 includes a transparent resin film 3 provided on both opposite main faces, respectively, with a transparent conducting layer 4 containing metal nanowires and a binder resin, and an overcoat layer 5, stacked in this order. The transparent resin film 3 is made of an amorphous cycloolefin-based resin, and the transparent resin film has a thickness $T_1$ of 5 to 25 μm. In the transparent conducting film laminate, the transparent conducting film 20 or 30 is releasably stacked on adhesive agent layer 2 of the carrier film 10, in a way so that the overcoat layer (in case of the opposite face structure where two overcoat layers are provided, such as the transparent conducting film 30, one of the overcoat layers) 5 forms the outermost layer. The protection film 1 is made of polyester having an aromatic ring in the molecular backbone. The protection film 1 has a thickness $T_2$ which is 5 times or more of the thickness $T_1$ of the transparent resin film 3, and is 150 μm or less. FIG. 1 and FIG. 2 show schematic cross-sectional views of the transparent conducting film laminate according to the aspects, respectively.

As shown in FIG. 1, according to the first aspect, a transparent conducting layer 4 containing metal nanowires and a binder resin, and an overcoat layer 5 are stacked, in this order, on one main face of the transparent resin film 3. Namely, the transparent conducting film laminate includes a transparent conducting film 20, and a career film 10 stacked on the transparent conducting film 20. The carrier film 10 is provided with a protection film 1 and an adhesive agent layer 2 provided on one main face of the protection film 1. The transparent conducting film 20 includes a transparent resin film 3 provided on one main face thereof with a transparent conducting layer 4 containing metal nanowires and a binder resin, and an overcoat layer 5, stacked in this order. The carrier film 10 is releasably stacked on the transparent conducting film 20 with the adhesive agent layer 2 therebetween, in a way so that the main face of the transparent resin film 3 opposite to the main face where the transparent conducting layer 4 is provided, faces the adhesive agent layer 2.

As shown in FIG. 2, according to the second aspect, a transparent conducting layer 4 containing metal nanowires and a binder resin, and an overcoat layer 5 are stacked, in this order, on both of the opposite main faces of the transparent resin film 3, respectively. Namely, the transparent conducting film laminate includes a transparent conducting film 30 and a carrier film 10 stacked on the transparent conducting film 30. The carrier film 10 includes a protection film 1 and an adhesive agent layer 2 provided on one main face of the protection film 1. The transparent conducting film 30 includes a transparent resin film 3 provided, on both of the opposite main faces thereof, with a transparent conducting layer 4 containing metal nanowires and a binder resin, and an overcoat layer 5 stacked in this order, respectively. The carrier film 10 is releasably stacked on the surface of one of the overcoat layers 5 of the transparent conducting film 30, with an adhesive agent layer 2 therebetween.

<Transparent Resin Film 3>

The transparent resin film 3 is formed of an amorphous cycloolefin-based resin, and has high transparency and a low water absorption property. By adopting an amorphous cycloolefin-based resin film for the transparent resin film 3, a transparent conducting film laminate provided with a transparent conducting film with a superior optical property, can be obtained.

The amorphous cycloolefin-based resin is a (co)polymer containing 50 mol % or more of cycloolefin such as norbornene, etc., including: hydrogenated ring-opening metathesis polymerization type cycloolefin polymer of norbornene (ZEONOR (registered trademark, manufactured by Zeon Corporation), ZEONEX (registered trademark, manufactured by Zeon Corporation), ARTON (registered trademark, manufactured by JSR Corporation), etc.), and norbornene/ethylene addition copolymer type cycloolefin polymer (APEL (registered trademark, manufactured by Mitsui Chemicals Inc.), TOPAS(registered trademark, manufactured by Polyplastics Co., Ltd.)).

Specific examples include ZEONOR ZF-14, ZF-16, ARTON RX4500, RH4900, R5000. In the present specification, "transparent" refers to having a total light transmittance of 70% or higher.

The surface of the transparent resin film 3 may be previously subjected to plasma treatment, corona treatment, etc., to thereby increase the adhesion property of the transparent conducting layer 4, etc., to be formed on the transparent resin film 3. Also, before the transparent conducting layer 4 is formed, solvent cleaning or ultrasonic cleaning may be applied to the transparent resin film 3 in accordance with needs, for dedusting and cleaning the surface.

The transparent resin film 3 has a thickness $T_1$ within a range of 5 to 25 μm, preferably within a range of 10 to 23 μm, and more preferably within a range of 13 to 23 μm. When the thickness of the transparent resin film 3 exceeds the upper limit value of the above range, a crack easily occurs when the film is folded. On the other hand, if the thickness is less than the lower limit value of the above range, producing a film having smoothness and having a uniform thickness becomes difficult.

The glass transition temperature (Tg) of the amorphous cycloolefin-based resin for the transparent resin film 3 is not particularly limited, but preferably within a range of 130 to 170° C. Thereby, the occurrence amount and the direction of curls after the heating step such as drying can be controlled, and thus, processing and conveyance of the transparent conducting film laminates become easy.

<Transparent Conducting Layer 4>

As a conducting material constituting the transparent conducting layer 4 formed on the transparent resin film 3, metal nanowires can be used. The metal nanowire is metal having a diameter in the order of nanometer, and is a conducting material having a wire shape. In the present aspect, together with (mixing with) the metal nanowires, or instead of the metal nanowires, a metal nanotube which is a conducting material having a porous or nonporous tubular shape can be used. In the present specification, both the "wire" shape and the "tubular" shape refer to a linear shape, and the former is not hollow, whereas the latter is hollow. They may be soft or rigid. The former is referred to as "metal nanowire in a narrow sense", and the latter is referred to as "metal nanotube in a narrow sense". Hereinbelow, in the present specification, "metal nanowire" is used to include both the metal nanowire in a narrow sense and the metal nanotube in the narrow sense. Either the metal nanowire in a narrow sense or the metal nanotube in a narrow sense may be used solely, but they may be mixed.

In the present specification, the "transparent conducting layer" refers to a layer in the shape of a thin film including the above metal nanowires and the below-mentioned binder resin, is not limited to a layer having a uniform thickness. The thickness is preferably in the range of 20 to 200 nm.

As a method for producing the metal nanowire, a known method may be applied. For example, silver nanowires may be synthesized by reducing the silver nitrate under the presence of poly-N-vinylpyrrolidone, using a poly-ol method (refer to Chem. Mater., 2002, 14, 4736). Similarly, gold nanowires may be synthesized by reducing the gold chloride acid hydrate under the presence of polyvinylpyrrolidone (refer to J. Am. Chem. Soc., 2007, 129, 1733). WO 2008/073143 pamphlet and WO 2008/046058 pamphlet have detailed description regarding the technology of large scale synthesis and purification of silver nanowires and gold nanowires. Gold nanotubes having a porous structure may be synthesized by using silver nanowires as templates, and reducing a gold chloride acid solution. The silver nanowires used as templates are dissolved in the solution by oxidation-reduction reaction with the gold chloride acid, and as a result, gold nanotubes having a porous structure can be produced (refer to J. Am. Chem. Soc., 2004, 126, 3892-3901).

The metal nanowires have an average diameter size (average diameter) of preferably 1 to 500 nm, more preferably 5 to 200 nm, still more preferably 5 to 100 nm, and particularly preferably 10 to 50 nm. The metal nanowires have an average major axis length (average length) of preferably 1 to 100 μm, more preferably 1 to 80 μm, still more preferably 2 to 70 μm, and particularly preferably 5 to 50 μm. While satisfying the above ranges of the average diameter size and the average major axis length, the metal nanowires have an average aspect ratio of preferably more than 5, more preferably 10 or more, still more preferably 100 or more, and particularly preferably 200 or more. Here, the aspect ratio refers to a value obtained by a/b, wherein "b" represents an average diameter size of the metal nanowire and "a" represents an average major axis length thereof. The values "a" and "b" may be measured by a scanning electron microscope (SEM) and an optical microscope. Specifically, "b" (average diameter) is obtained by measuring diameters of any selected 100 metal nanowires respectively using the Field Emission Scanning Electron Microscope JSM-7000F (manufactured by JEOL Ltd.), and calculating the arithmetic average thereof. Further, "a" (average length) is obtained by measuring lengths of any selected 100 metal nanowires respectively using the Shape Measurement Laser Microscope VK-X200 (manufactured by Keyence Corporation), and calculating the arithmetic average thereof.

The kind of the metal as a material for the metal nanowires may be one selected from the group consisting of gold, silver, platinum, copper, nickel, iron, cobalt, zinc, ruthenium, rhodium, palladium, cadmium, osmium, and iridium, or may be an alloy etc., formed by combining some of these. In order to obtain a coating film having a low surface resistance and a high total light transmittance, containing at least one of gold, silver, and copper is preferable. These metals have a high electroconductivity, and thus, when a certain surface resistance should be obtained, the density of the metal within the surface may be reduced, and high total light transmittance can be achieved. Among these metals, containing at least gold or silver is more preferable. The most appropriate example may be the silver nanowire.

The transparent conducting layer 4 includes a binder resin in addition to the metal nanowires. As for the binder resin, any transparent binder can be used with no limitation. In case that metal nanowire produced by the poly-ol method is used as a conducting material, a binder resin soluble in alcohol or water is preferable, in view of the compatibility to the solvent for production (polyol). Specifically, the binder may be poly-N-vinyl pyrrolidone, a water-soluble cellulose resin such as methyl cellulose, hydroxyethyl cellulose, carboxymethyl cellulose, and the like, a butyral resin, or poly-N-vinylacetamide (PNVA (registered trademark)). The above resin may be used solely, or two or more kinds of the resin may be used in combination. Poly-N-vinylacetamide is a homopolymer of N-vinylacetamide (NVA), but a copolymer having 70 mol % or more of N-vinylacetamide (NVA) may also be used. Examples of a monomer which can be copolymerized with NVA include: N-vinylformamide, N-vinylpyrrolidone, acrylic acid, methacrylic acid, sodium acrylate, sodium methacrylate, acrylamide, acrylonitrile, and the like. The more the content of the copolymerized component, the higher the surface resistance of the transparent conducting pattern (transparent conducting layer 4) to be obtained, the lower the adhesion between the silver nanowires (metal nanowires) and the substrate film, and the lower the heat resistance (thermal decomposition starting temperature). Therefore, the polymer contains the monomer unit derived from N-vinylacetamide preferably 70 mol % or more, more preferably 80 mol % or more, and still more preferably 90 mol % or more. The polymer (homopolymer or copolymer) including N-vinylacetamide a monomer unit has a weight average molecular weight in terms of absolute molecular weight of preferably 30,000 to 4,000,000, more preferably 100,000 to 3,000,000, and still more preferably 300,000 to 1,500,000. The weight average molecular weight in terms of absolute molecular weight was measured by the following method.

<Molecular Weight Measurement>

The binder resin was dissolved in the following eluent, which was left to stand still for 20 hours. The concentration of the binder resin in the resultant solution was 0.05% by mass.

The solution was filtered by a 0.45 μm membrane filter, the filtrate was measured by GPC-MALS, and a weight-average molecular weight based on the absolute molecular weight was calculated.
GPC: Shodex (registered trademark) SYSTEM 21, manufactured by Showa Denko K.K.
Column: TSK gel (registered trademark) G6000PW, manufactured by Tosoh Corporation
Column Temperature: 40° C.
Eluent: 0.1 mol/L of $NaH_2PO_4$ aqueous solution+0.1 mol/L of $Na_2HPO_4$ aqueous solution
Flow Rate: 0.64 mL/min
Sample Injection Volume: 100 μL
MALS Detector: DAWN (registered trademark) DSP, manufactured by Wyatt Technology Corporation
Laser Wavelength: 633 nm
Multi-Angle Fitting Method: Berry Method The transparent conducting layer 4 is formed by printing, as a coating liquid, a conductive ink (metal nanowire ink) containing the metal nanowires, the binder resin, and the solvent on one main face or both main faces of the transparent resin film 3, and drying and removing the solvent.

The solvent is not particularly limited as far as the solvent has a superior metal nanowire dispersibility, and the binder resin can be dissolved in the solvent. However, if the metal nanowire synthesized by the poly-ol method is used as the conducting material, alcohol, water or a mixture solvent of alcohol and water is preferable, in view of the compatibility to the solvent used for production (polyol). As mentioned above, a preferable binder resin is also a binder resin soluble to alcohol, water, or a mixture solvent of alcohol and water. The mixture solvent of alcohol and water is more preferable because the drying speed of the binder resin can be easily controlled. As an alcohol, at least one kind of saturated monohydric alcohols having 1 to 3 carbon atoms (methanol, ethanol, n-propanol, and isopropanol), which are represented by $C_nH_{2n+1}OH$ (n being an integer of 1 to 3) (hereinbelow, simply referred to as saturated monohydric alcohol having 1 to 3 carbon atoms). Containing 40% by mass or more of the saturated monohydric alcohol having 1 to 3 carbon atoms in the alcohol in total is preferable. Using the saturated monohydric alcohol having 1 to 3 carbon atoms is advantageous because drying process becomes easy.

Alcohols other than the saturated monohydric alcohol having 1 to 3 carbon atoms can be used together. Examples of other alcohols which can be used together with the saturated monohydric alcohol having 1 to 3 carbon atoms include ethylene glycol, propylene glycol, ethylene glycol monomethylether, ethylene glycol monoethylether, propylene glycol monomethylether, propylene glycol monoethylether, and the like. Using such alcohol together with abovementioned saturated monohydric alcohol having 1 to 3 carbon atoms represented by $C_nH_{2n+1}OH$ (n being an integer of 1 to 3) is advantageous because the drying speed can be adjusted. Further, the content of the alcohol in total in the mixture solvent is preferably 5% to 90% by mass. If the content is less than 5% by mass, or more than 90% by mass, there are drawbacks that a stripe pattern (uneven coating) is generated at the time of coating.

The conductive ink can be produced by stirring and mixing the metal nanowires, the binder resin, and the solvent, using a planetary centrifugal stirrer, and the like. The content of the binder resin in the conductive ink is preferably in the range of 0.01% to 1.0% by mass. The content of the metal nanowire in the conductive ink is preferably in the range of 0.01% to 1.0% by mass. The content of the solvent in the conductive ink is preferably in the range of 98.0% to 99.98% by mass. By the above composition, the conductive ink having a viscosity of 1 to 50 mPa·s can be obtained. By printing the ink on the main face of the transparent resin film 3, and drying/removing the solvent, a transparent conducting layer 4 having a film thickness of 20 to 200 nm can be obtained. The viscosity of the conductive ink is more preferably 1 to 20 mPa·s, and still more preferably 1 to 10 mPa·s. The viscosity was measured by the digital viscometer DV-E (spindle: SC4-18) manufactured by Brookfield, at 25° C.

A method for producing the transparent conducting film 20, 30 (method for printing the conductive ink) may be a bar-coating method, a gravure printing method, an ink-jet method, a slit-coating method, and the like. Among them, the bar-coating method has a preferable coating ability of a low-viscosity ink, and a superior property for forming a thin film. Further, unlike the ink-jet method, the bar-coating method can print a low-viscosity ink containing inorganic or metal particles, without causing clogging.

<Overcoat Layer 5>

An overcoat layer 5 which protects the transparent conducting layer 4 is preferably a cured film of a curable resin composition. The curable resin composition preferably comprises (A) a polyurethane containing a carboxy group, (B) an epoxy compound, (C) a curing accelerator, and (D) a solvent. The curable resin composition is applied on the transparent conducting layer 4 by printing, coating, etc., and cured to form the overcoat layer 5. Curing of the curable resin composition can be performed by heating and drying a thermo-curable resin composition.

The (A) polyurethane containing a carboxy group has a weight-average molecular weight of preferably 1,000 to 100,000, more preferably 2,000 to 70,000, and still more preferably 3,000 to 50,000. The molecular weight is a polystyrene equivalent value measured by gel permeation chromatography (hereinafter, referred to as GPC). If the molecular weight is less than 1,000, the elongation property, the flexibility, and the strength of the printed coating film may be deteriorated. Whereas, if the molecular weight exceeds 100,000, solubility of polyurethane to the solvent decreases, and further, even if polyurethane can dissolve in the solvent, the viscosity becomes too high, resulting in increasing restrictions on use.

In the present specification, unless specifically described, measurement conditions of GPC are as follows.

Device Name: HPLC unit HSS-2000, manufactured by JASCO Corporation

Column: Shodex Colum LF-804

Mobile Phase: tetrahydrofuran

Flow Rate: 1.0 mL/min

Detector: RI-2031 Plus, manufactured by JASCO Corporation

Temperature: 40.0° C.

Sample Volume: sample loop 100 μL

Sample Concentration: Prepared to approximately 0.1% by mass

The (A) polyurethane containing a carboxy group has an acid value of preferably 10 to 140 mg-KOH/g, and more preferably 15 to 130 mg-KOH/g. If the acid value is 10 mg-KOH/g or more, both the curing property and the solvent resistance are superior. If the acid value 140 mg-KOH/g or less, the solubility to the solvent as polyurethane is superior, and adjustment to a desirable viscosity is easy. In addition, problems such that the cured product becomes too hard and warpage, etc., of the substrate film occurs, can be prevented.

Further, in the present specification, the acid value of a resin is a value measured by the following method.

Approximately 0.2 g of sample is precisely weighed by a precision balance into a 100 ml Erlenmeyer flask, and 10 ml of a mixture solvent of ethanol/toluene=1/2 (mass ratio) is provided thereto to dissolve the sample. Further, 1 to 3 drops of a phenolphthalein ethanol solution is added to the container as an indicator, which is sufficiently stirred until the sample becomes uniform. The resultant is subjected to titration with a 0.1 N potassium hydroxide-ethanol solution. When the indicator continues to be in light red for 30 seconds, it is determined that the neutralization ends. The value obtained from the result using the following calculation formula is treated as an acid value of the resin.

$$\text{Acid Value (mg-KOH/g)}=[B \times f \times 5.611]/S$$

B: Use amount (ml) of 0.1 N potassium hydroxide-ethanol solution f: Factor of 0.1 N potassium hydroxide-ethanol solution S: Collection quantity (g) of sample More specifically, the (A) polyurethane containing a carboxy group is polyurethane synthesized by using (a1) a polyisocyanate compound, (a2) a polyol compound, and (a3) a dihydroxy compound containing a carboxy group, as monomers. From the viewpoint of light resistance, preferably, each of (a1), (a2), and (a3) does not contain a functional group with conjugate properties such as an aromatic compound. Hereinbelow, each monomer will be explained in more detail.

(a1) Polyisocyanate Compound

For (a1) polyisocyanate compound, usually, diisocyanate which has two isocyanato groups per molecule is used. Examples of the polyisocyanate compound include: aliphatic polyisocyanate, alicyclic polyisocyanate, and the like. One of them may be used by itself, or two or more of them may be used in combination. As far as (A) polyurethane containing a carboxy group is not turned into a gel, a small amount of polyisocyanate having three or more isocyanato groups may also be used.

Examples of the aliphatic polyisocyanate include: 1,3-trimethylene diisocyanate, 1,4-tetramethylene diisocyanate, 1,6-hexamethylene diisocyanate, 1,9-nonamethylene diisocyanate, 1,10-decamethylene diisocyanate, 2,2,4-trimethylhexamethylene diisocyanate, 2,4,4-trimethylhexamethylene diisocyanate, lysine diisocyanate, 2,2'-diethyl ether diisocyanate, dimer acid diisocyanate, and the like.

Examples of the alicyclic polyisocyanate include: 1,4-cyclohexane diisocyanate, 1,3-bis(isocyanatomethyl)cyclohexane, 1,4-bis(isocyanatomethyl)cyclohexane, 3-isocyanatomethyl-3,5,5-trimethylcyclohexyl isocyanate (IPDI, isophorone diisocyanate), bis(4-isocyanato cyclohexyl) methane (Hydrogenated MDI), hydrogenated (1,3- or 1,4-) xylylene diisocyanate, norbornane diisocyanate, and the like.

Here, if an alicyclic compound having 6 to 30 carbon atoms other than the carbon atoms in the isocyanato group (—NCO group) is used as (a1) polyisocyanate compound, a protective film formed by the polyurethane resin according to the present aspect has high reliability particularly under high temperature and high humidity, and is suitable as a member for an electronic device component.

From the viewpoints of weather resistance and light resistance, as for (a1) polyisocyanate compound, using a compound which does not have an aromatic ring is preferable. The content of the aromatic polyisocyanate and the aromatic-aliphatic polyisocyanate is preferably 50 mol % or less, more preferably 30 mol % or less, and still more preferably 10 mol % or less, relative to the total amount (100 mol %) of (a1) polyisocyanate compound.

(a2) Polyol Compound

The number average molecular weight of (a2) polyol compound (with the proviso that (a2) polyol compound does not include (a3) dihydroxy compound having a carboxy group) is usually 250 to 50,000, preferably 400 to 10,000, and more preferably 500 to 5,000. The molecular weight is a polystyrene equivalent value measured by the GPC under the above mentioned conditions.

Preferably, (a2) polyol compound is diol having hydroxy groups at both ends. Examples of (a2) polyol compound include: polycarbonate polyol, polyether polyol, polyester polyol, polylactone polyol, polysilicone having hydroxy groups at both ends, and a polyol compound having 18 to 72 carbon atoms obtained by adding hydrogen to a C18 (carbon atom number 18) unsaturated fatty acid made from vegetable oil and a polycarboxilic acid derived from a polymer of the C18 unsaturated fatty acid, and converting the carboxylic acid into hydroxy groups. Among them, in view of the balance of the water resistance, the insulation reliability, and the adhesion to a substrate as a protective film, polycarbonate polyol is preferable.

The polycarbonate polyol can be obtained from diol having 3 to 18 carbon atoms as a raw material, through reaction with carbonate ester or phosgene, and can be represented by, for example, the following structural formula (1):

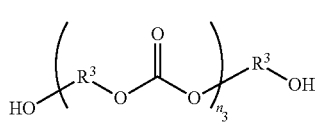

(1)

In Formula (1), $R^3$ represents a residue obtained by removing a hydroxy group from a corresponding diol (HO—$R^3$—OH), which is an alkylene group having 3 to 18 carbon atoms, $n_3$ represents a positive integer, which is preferably 2 to 50.

The polycarbonate polyol represented by Formula (1) can be produced by using a raw material, for example: 1,3-propanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, and 1,2-tetradecanediol, etc.

The polycarbonate polyol may be a polycarbonate polyol (copolymerized polycarbonate polyol) having a plurality of types of alkylene groups in its skeleton. Using a copolymerized polycarbonate polyol is advantageous in many cases from the viewpoint of preventing crystallization of (A) polyurethane containing a carboxy group. Further, taking the solubility to the solvent into account, using, in combination, a polycarbonate polyol having a branched skeleton and having hydroxy groups at the ends of the branched chains, is preferable.

The polyether polyol is obtained by the dehydration condensation of a diol having 2 to 12 carbon atoms, or the ring-opening polymerization of an oxirane compound, oxetane compound, or tetrahydrofuran compound, etc., having 2 to 12 carbon atoms, and may be represented by, for example, the following structural formula (2):

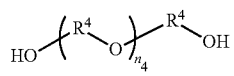

(2)

In Formula (2), $R^4$ represents a residue obtained by removing a hydroxy group from a corresponding diol (HO—$R^4$—OH), which is an alkylene group having 2 to 12 carbon atoms, $n_4$ represents a positive integer, which is preferably 4 to 50. One type of the diol having 2 to 12 carbon atoms may be used by itself to form a homopolymer, or two or more types may be used in combination to form a copolymer.

Specific examples of the polyether polyol represented by the above Formula (2) include: polyalkylene glycols such as polyethylene glycol, polypropylene glycol, poly-1,2-butylene glycol, polytetramethylene glycol (poly 1,4-butanediol), poly-3-methyltetramethylene glycol, polyneopentyl glycol, and the like. Further, in order to increase the hydrophobic property of the polyether polyol, a copolymer of these, for example, a copolymer of 1,4-butanediol and neopentyl glycol, etc., may be used.

The polyester polyol may be obtained by dehydration condensation of a dicarboxylic acid and a diol, or transesterification of diol with a lower alcohol ester of a dicarboxylic acid, and may be represented by, for example, the following structural formula (3):

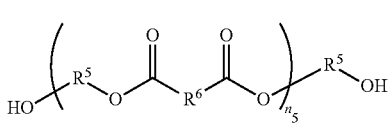

(3)

In Formula (3), $R^5$ represents a residue obtained by removing a hydroxy group from the corresponding diol (HO—$R^5$—OH), which is an alkylene group or an organic group having 2 to 10 carbon atoms, $R^6$ represents a residue obtained by removing two carboxy groups from the corresponding dicarboxylic acid (HOCO—$R^6$—COOH), which is an alkylene group or an organic group having 2 to 12 carbon atoms, and $n_5$ represents a positive integer, which is preferably 2 to 50.

Specific examples of the diol (HO—$R^5$—OH) include: ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, 1,2-tetradecanediol, 2,4-diethyl-1,5-pentanediol, butyl ethyl propanediol, diethylene glycol, triethylene glycol, dipropylene glycol, and the like.

Specific examples of the dicarboxylic acid (HOCO—$R^6$—COOH) include: succinic acid, glutaric acid, adipic acid, azelaic acid, sebacic acid, decane dicarboxylic acid, brasylic acid, 1,4-cyclohexane dicarboxylic acid, hexahydrophthalic acid, methyl tetrahydrophthalic acid, endomethylene tetrahydrophthalic acid, methyl endomethylene tetrahydrophthalic acid, chlorendic acid, fumaric acid, maleic acid, itaconic acid, citraconic acid.

The polylactone polyol may be obtained by the condensation reaction of a ring-opening polymerized lactone and a diol, or the condensation reaction of a diol and a hydroxy alkanoic acid, and may be represented by, for example, the following structural formula (4):

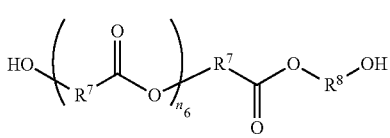

(4)

In Formula (4), $R^7$ represents a residue obtained by removing a hydroxy group and a carboxy group from a corresponding hydroxy alkanoic acid (HO—$R^7$—COOH), which is an alkylene group having 4 to 8 carbon atoms, $R^8$ represents a residue obtained by removing a hydroxy group from a corresponding diol (HO—$R^8$—OH), which is an alkylene group having 2 to 10 carbon atoms, and $n_6$ is a positive integer, which is preferably 2 to 50.

Specific examples of the hydroxy alkanoic acid (HO—$R^7$—COOH) include: 3-hydroxybutanoic acid, 4-hydroxypentanoic acid, 5-hydroxyhexanoic acid, and the like. Examples of lactone include ε-caprolactone.

The polysilicone having hydroxy groups at both ends may be represented by, for example, the following structural formula (5):

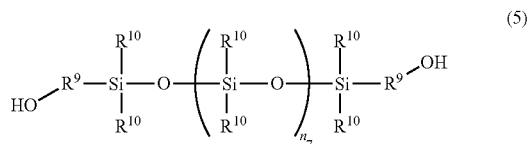

In Formula (5), $R^9$ independently represents a divalent aliphatic hydrocarbon residue having 2 to 50 carbon atoms, $n_7$ is a positive integer, which is preferably 2 to 50. $R^9$ may include an ether group. Each of a plurality of $R^{10}$ independently represents an aliphatic hydrocarbon group having 1 to 12 carbon atoms.

Market products of the polysilicone having hydroxy groups at both ends include, for example, "X-22-160AS, KF6001, KF6002, KF-6003" manufactured by Shin-Etsu Chemical Co., Ltd., and the like.

Specific examples of the "a polyol compound having 18 to 72 carbon atoms obtained by adding hydrogen to a C18 unsaturated fatty acid made from vegetable oil and a polycarboxilic acid derived from a polymer of the C18 unsaturated fatty acid, and converting the carboxylic acid into hydroxy groups" include a diol compound having a skeleton of a hydrogenated dimer acid, and a marketed product thereof is, for example, "Sovermol (registered trademark) 908" manufactured by Cognis.

As far as the effect of the present disclosure is not ruined, a diol having a molecular weight of 300 or less, which is usually used as a diol component for synthesizing polyester or polycarbonate may be used as (a2) polyol compound. Specific examples of such a low molecular weight diol include: ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, 1,2-tetradecanediol, 2,4-diethyl-1,5-pentanediol, butyl ethyl propanediol, diethylene glycol, triethylene glycol, and dipropylene glycol, and the like.

(a3) Dihydroxy Compound Containing Carboxy Group

Preferably, (a3) a dihydroxy compound containing a carboxy group is a carboxylic acid or an amino carboxylic acid having a molecular weight of 200 or less, having two groups selected from a hydroxy group, a hydroxyalkyl group with one carbon, and a hydroxyalkyl group with 2 carbons, because a cross linking point is controllable. Specific examples include: 2,2-dimethylolpropionic acid, 2,2-dimethylolbutanoic acid, N,N-bis hydroxyethyl glycine, N,N-bis hydroxyethyl alanine, and the like. Among them, in view of the solubility to the solvent, 2,2-dimethylolpropionic acid, 2,2-dimethylolbutanoic acid are particularly preferable. One type of the compounds of (a3) dihydroxy compound containing a carboxy group can be used by itself, or two or more types may be used in combination.

The above-mentioned (A) a polyurethane containing a carboxy group can be synthesized from the above three components ((a1), (a2), and (a3)) only. However, (a4) a monohydroxy compound and/or (a5) a monoisocyanate compound may be further reacted for synthesis. In view of the light resistance, using a compound which does not have an aromatic ring and a carbon-carbon double bond in a molecule is preferable.

(a4) Monohydroxy Compound

An example of (a4) monohydroxy compound is a compound having a carboxy group such as a glycolic acid, a hydroxypivalic acid, etc.

One type of (a4) monohydroxy compound can be used by itself, or two or more types of (a4) can be used in combination.

Other examples of (a4) monohydroxy compound include: methanol, ethanol, n-propanol, isopropanol, n-butanol, isobutanol, sec-butanol, t-butanol, amyl alcohol, hexyl alcohol, octyl alcohol, and the like.

(a5) Monoisocyanate Compound

Examples of (a5) monoisocyanate compound include: hexyl isocyanate, dodecyl isocyanate, and the like.

The above-mentioned (A) polyurethane containing a carboxy group can be synthesized by reacting the above-mentioned (a1) polyisocyanate compound, (a2) polyol compound, and (a3) dihydroxy compound containing a carboxy group, under the presence or absence of a known urethanization catalyst such as dibutyltin dilaurate, using an appropriate organic solvent. However, performing reaction without a catalyst is preferable because there would be no need to concern about the mixing of tin, etc., in the final product.

The organic solvent is not particularly limited as far as the reactivity with the isocyanate compound is low, but a preferable solvent is a solvent free from a basic functional group such as amine, etc., and having a boiling point of 50° C. or higher, preferably 80° C. or higher, and more preferably 100° C. or higher. Examples of such a solvent include: toluene, xylylene, ethylbenzene, nitrobenzene, cyclohexane, isophorone, diethylene glycol dimethyl ether, ethylene glycol diethyl ether, ethylene glycol monomethyl ether acetate, propylene glycol monomethyl ether acetate, propylene glycol monoethyl ether acetate, dipropylene glycol monomethyl ether acetate, diethylene glycol monoethyl ether acetate, methyl methoxypropionate, ethyl methoxypropionate, methyl ethoxypropionate acid, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, γ-butyrolactone, dimethyl sulfoxide, and the like.

Taking into account that it is not preferable to use an organic solvent in which the polyurethane to be generated does not dissolve well, and that the polyurethane is used as a raw material for a curable resin composition for the overcoat layer 5, in the usage as an electronic material, propylene glycol monomethyl ether acetate, propylene glycol monoethyl ether acetate, dipropylene glycol monomethyl ether acetate, diethylene glycol monoethyl ether acetate, γ-butyrolactone, etc., are particularly preferable among the above.

The addition sequence of the raw materials is not limited, but usually, first, (a2) polyol compound and (a3) dihydroxy compound having a carboxy group are provided, and dissolved or dispersed in the solvent, and thereafter, (a1) polyisocyanate compound is added by dropping at 20 to 150° C., and more preferably at 60 to 120° C., which is then reacted at 30 to 160° C., and preferably at 50 to 130° C.

The molar ratio of the added raw materials is adjusted in accordance with the molecular weight and the acid value of the objected polyurethane. In case that (a4) monohydroxy compound is introduced to polyurethane, in order that the polyurethane molecule has an isocyanato group at the end, (a1) polyisocyanate compound must be used in excess of the sum of (a2) polyol compound and (a3) dihydroxy compound having a carboxy group (isocyanato groups in total should be in excess of the hydroxy groups in total). In case that (a5) monoisocyanate compound is introduced to polyurethane, in order that the polyurethane molecule has a hydroxy group at the end, (a1) polyisocyanate compound should be used less than the sum of (a2) polyol compound and (a3) dihydroxy compound having a carboxy group (isocyanato groups in total should be less than hydroxy groups in total).

Specifically, the molar ratio of the provided materials is that isocyanato group of (a1) polyisocyanate compound: (hydroxy group of (a2) polyol compound+hydroxy group of (a3) dihydroxy compound having a carboxy group) is 0.5 to 1.5:1, preferably 0.8 to 1.2:1, and more preferably 0.95 to 1.05:1.

Further, hydroxy group of (a2) polyol compound: hydroxy group of (a3) dihydroxy compound having a carboxy group is 1:0.1 to 30, and preferably 1:0.3 to 10.

When (a4) monohydroxy compound is used, the molar number of (a1) polyisocyanate compound should be in excess of the molar number of ((a2) polyol compound+(a3) dihydroxy compound having a carboxy group), and 0.5 to 1.5 times of molar amount, preferably 0.8 to 1.2 times of molar amount of (a4) monohydroxy compound is used, relative to the excess molar number of the isocyanato group.

When (a5) monoisocyanate compound is used, the molar number of ((a2) polyol compound+(a3) dihydroxy compound having a carboxy group) should be in excess of the molar number of (a1) polyisocyanate compound, and 0.5 to 1.5 times of molar amount, preferably 0.8 to 1.2 times of molar amount of (a5) monoisocyanate compound is used, relative to the excess molar number of the hydroxy group.

In order to introduce (a4) monohydroxy compound to (A) polyurethane containing a carboxy group, when the reaction of (a2) polyol compound and (a3) dihydroxy compound having a carboxy group with (a1) polyisocyanate compound is almost complete, (a4) monohydroxy compound is dropped to the reaction solution at 20 to 150° C., and more preferably at 70 to 120° C., to react the isocyanato groups remaining at both ends of (A) polyurethane containing a carboxy group with (a4) monohydroxy compound, and the temperature is maintained until the end of the reaction.

In order to introduce (a5) monoisocyanate compound to (A) polyurethane containing a carboxy group, when the reaction of (a2) polyol compound and (a3) dihydroxy compound having a carboxy group with (a1) polyisocyanate compound is almost complete, (a5) monoisocyanate compound is dropped to the reaction solution at 20 to 150° C., and more preferably at 50 to 120° C., to react the hydroxy groups remaining at both ends of (A) polyurethane containing a carboxy group with (a5) monoisocyanate compound, and the temperature is maintained until the end of the reaction.

Examples of (B) epoxy compound include: an epoxy compound having two or more epoxy groups in one molecule, such as bisphenol-A type epoxy resin, hydrogenated bisphenol-A type epoxy resin, bisphenol-F type epoxy resin, novolak type epoxy resin, phenol novolak type epoxy resin, cresol novolak type epoxy resin, N-glycidyl type epoxy resin, bisphenol A novolak type epoxy resin, chelate type epoxy resin, glyoxal type epoxy resin, amino group-containing epoxy resin, rubber-modified epoxy resin, dicyclopentadiene phenolic type epoxy resin, silicone-modified epoxy resin, ε-caprolactone-modified epoxy resin, aliphatic-type epoxy resin containing a glycidyl group, alicyclic epoxy resin containing a glycidyl group, etc.

In particular, an epoxy compound having three or more epoxy groups in one molecule is more preferable. Examples of such an epoxy compound include: EHPE (registered trademark) 3150 (manufactured by Daicel Corporation), jER (registered trademark) 604 (manufactured by Mitsubishi Chemical Corporation), EPICLON (registered trademark) EXA-4700 (manufactured by DIC Corporation), EPICLON (registered trademark) HP-7200 (manufactured by DIC Corporation), pentaerythritol tetraglycidyl ether, pentaerythritol triglycidyl ether, TEPIC (registered trademark) -S (manufactured by Nissan Chemical Corporation), and the like.

The (B) epoxy compound may contain an aromatic ring in a molecule, and in this case, the mass of (B) is preferably 20% by mass or less, relative to the total mass of (A) and (B).

The mixing ratio of (A) polyurethane containing a carboxy group relative to (B) epoxy compound is preferably 0.5 to 1.5, more preferably 0.7 to 1.3, and still more preferably 0.9 to 1.1, in terms of equivalent ratio of the carboxy groups of polyurethane relative to the epoxy groups of (B) epoxy compound.

Examples of (C) curing accelerator include: a phosphine-based compound such as triphenylphosphine, tributylphosphine (manufactured by Hokko Chemical Industry Co., Ltd.), Curezol (registered trademark) (imidazole-based epoxy resin curing agent: manufactured by Shikoku Chemicals Corporation), 2-phenyl-4-methyl-5-hydroxy methyl imidazole, U-CAT (registered trademark) SA series (DBU salt: manufactured by San-Apro Ltd.), Irgacure (registered trademark) 184, and the like. With respect to the used amount of these, if the amount is too small, the effect of addition cannot be obtained, whereas if the amount is too large, the electric insulation is decreased. Therefore, 0.1 to 10 parts by mass, more preferably 0.5 to 6 parts by mass, still more preferably 0.5 to 5 parts by mass, and particularly preferably 0.5 to 3 parts by mass, is used, relative to 100 parts by mass in total of (A) and (B).

Further, a curing aid may be used together. The curing aid may be a polyfunctional thiol compound, an oxetane compound, and the like. Examples of the polyfunctional thiol compound include: pentaerythritol tetrakis(3-mercaptopropionate), tris-[(3-mercaptopropionyloxy)-ethyl]-isocyanurate, trimethylolpropane tris(3-mercaptopropionate), Karenz (registered trademark) MT series (manufactured by Showa Denko K. K.), and the like. Examples of the oxetane compound include: ARON OXETANE (registered trademark) series (manufactured by Toagosei Co., Ltd.), ETERNACOLL (registered trademark) OXBP or OXMA (manufactured by Ube Industries Ltd.), and the like. With respect to the used amount, if the amount is too small, the effect of addition cannot be obtained, whereas if the amount is too large, the curing rate becomes too high, resulting in decreasing handling property. Therefore, 0.1 to 10% by mass, and preferably 0.5 to 6% by mass is used, relative to the mass of (B).

The content of (D) solvent used in the curable resin composition is preferably 95.0% by mass or more and 99.9% by mass or less, more preferably 96% by mass or more and 99.7% by mass or less, and still more preferably 97% by mass or more and 99.5% by mass or less. (D) solvent can be the solvent used for synthesizing (A) polyurethane containing a carboxy group as it is. Further, other solvent may be used for (D) in order to adjust the solubility or printability of polyurethane. When other solvent is used, the reaction solvent may be distilled away before or after a new solvent is added, to replace the solvent. Taking into account the cumbersomeness of operations and the energy cost, using at least a part of the solvent used for synthesizing (A) polyurethane containing a carboxy group as it is, is preferable. Taking the stability of the curable resin composition into account, the solvent has a boiling point of preferably 80° C. to 300° C., and more preferably 80° C. to 250° C. If the boiling point is lower than 80° C., drying easily proceeds during the printing, which causes unevenness. If the boiling point is higher than 300° C., heat treatment at a high temperature for a long time is required for drying and curing, which is not suitable for industrial production.

Examples of the solvent include: a solvent used for synthesizing polyurethane such as propylene glycol monomethyl ether acetate (boiling point 146° C.), γ-butyrolactone (boiling point 204° C.), diethylene glycol monoethyl ether acetate (boiling point 218° C.), tripropylene glycol dimethyl ether (boiling point 243° C.), etc., an ether-based solvent such as propylene glycol dimethyl ether (boiling point 97° C.), diethylene glycol dimethyl ether (boiling point 162° C.), etc., a solvent having a hydroxy group such as isopropyl alcohol (boiling point 82° C.), t-butyl alcohol (boiling point 82° C.), 1-hexanol (boiling point 157° C.), propylene glycol monomethyl ether (boiling point 120° C.), diethylene glycol monomethyl ether (boiling point 194° C.), diethylene glycol monoethyl ether (boiling point 196° C.), diethylene glycol monobutyl ether (boiling point 230° C.), triethylene glycol (boiling point 276° C.), ethyl lactate (boiling point 154° C.), etc., and methyl ethyl ketone (boiling point 80° C.), and ethyl acetate (boiling point 77° C.). One of these solvents may be used by itself, or a mixture of two or more types of them may be used. When two or more types of solvents are mixed, using a solvent having a hydroxy group and having a boiling point exceeding 100° C. in view of the solubility of the used polyurethane resin, epoxy resin., etc., and in order to prevent aggregation or precipitation, or using a solvent having a boiling point of 100° C. or lower in view of the drying property of the ink, in addition to the solvent used for synthesizing (A) polyurethane containing a carboxy group, is preferable.

The above mentioned curable resin composition can be produced by mixing (A) polyurethane containing a carboxy group, (B) epoxy compound, (C) curing accelerator, and (D) solvent so that the content of (D) solvent becomes 95.0% by mass or more and 99.9% by mass or less, and stirring the mixture until the mixture becomes uniform.

The solid content in the curable resin composition may differ depending on the desired film thickness or printing method, but is preferably 0.1 to 5.0% by mass, and more preferably 0.5% by mass to 3.0% by mass by mass. If the solid content is within the range of 0.1 to 5.0% by mass, when the composition is coated on a transparent conducting film, drawbacks such that the electrical contact from silver paste, etc., cannot be obtained due to the too large thickness, do not occur, and a protective film having a sufficient weather resistance and light resistance and a thickness of 50 to 500 nm can be obtained.

From the viewpoint of light resistance, the content of an aromatic ring-containing compound defined by the formula below is restricted to preferably 15% by mass or less, in the overcoat layer 5 (the solid content in the curable resin composition, i.e., (A) polyurethane containing a carboxy group, (B) epoxy compound, and curing residue of (C) curing accelerator). Here, considering that all or a part of (C) curing accelerator may disappear (by decomposition, volatilization, etc.) depending on curing conditions, "curing residue of (C) curing accelerator" refers to the (C) curing accelerator which remains in the overcoat layer 5 under the curing conditions. Further, "aromatic ring-containing compound" refers to a compound having at least one aromatic ring in molecule.

[(use amount of aromatic ring-containing compound)/(mass of overcoat layer 5 (mass of (A) polyurethane containing a carboxy group+mass of (B) epoxy compound+curing residue of (C) curing accelerator))*100(%)

The above mentioned curable resin composition is used for forming an overcoat layer 5, by coating the curable resin composition on the transparent resin film 3 having a transparent conducting layer 4 using a printing method such as a bar-coating printing, gravure printing, inkjet printing, slit coating, and the like, drying and removing the solvent, and subjecting the resultant to heat treatment and photoirradiation, in accordance with needs, to cure the curable resin.

<Carrier Film 10>

The carrier film 10 comprises a protection film 1 provided, on one main face thereof, with an adhesive agent layer 2. The carrier film 10, and transparent conducting films 20 and 30 releasably stacked on the carrier film 10, with the adhesive agent layer 2 therebetween, constitute a transparent conducting film laminate. When the carrier film 10 is released from the transparent conducting film laminate, the adhesive agent may also be released together with the protection film 1, or only the protection film 1 may be released.

<Protection Film 1>

For the protection film 1, a film made from polyester having an aromatic ring in the molecular backbone (hereinafter, referred to as "aromatic polyester") is used. Aromatic polyester used in the present disclosure is crystallizable polyester, and a specific example thereof may be a polyethylene terephthalate (PET)-based resin. The polyethylene terephthalate (PET)-based resin used in the present disclosure may be the polyethylene terephthalate (PET)-based resin by itself, or may include a component other than polyethylene terephthalate (PET), as far as the crystallizability is maintained. An example may be a copolymer formed by copolymerization of ethylene isophthalate unit with ethylene terephthalate unit, which has a glass transition temperature of preferably 50 to 90° C., and more preferably 60 to 80° C., or may be the one made by uniformly mixing polyethylene isophthalate (PEI), etc., with polyethylene terephthalate (PET). The aromatic polyester film of polyethylene terephthalate (PET), etc., is usually biaxially stretched, and thus, has a superior size stability compared to an amorphous resin film. The protection film 1 has a thickness $T_2$ which is 5 times or more of the thickness $T_1$ of the transparent resin film 3, that is, $T_2/T_1 \geq 5$, preferably $T_2/T_1 \geq 7$, and more preferably $T_2/T_1 \geq 8$. Further, $T_2$ is 150 μm or less, preferably 140 μm or less, and more preferably 130 μm or less, and is also preferably 100 μm or more, more preferably 110 μm or more, and still more preferably 120 μm or more. Within this range, a curl generated when the transparent conducting film laminate is heated, or a curl of the transparent conducting film laminate which is heated and then cooled, can be suppressed at a low level. Therefore, drawbacks occurring during the production of the transparent conducting film laminate and during the post-process using the transparent conducting film laminate can be prevented. Further, drawbacks occurring when a produced long transparent conducting film laminate is wound on a roll, can be prevented.

In the present specification, "being crystallizable" means that when a resin film heated to a melting point or higher and melted, and then, the melted resin is cooled to a room temperature, crystallization occurs. When a crystallizable resin is subjected to Differential Scanning Calorimetry (DSC) in compliance with JIS K7121, Testing Methods for Transition Temperatures of Plastics, a peak due to crystallization (crystallization temperature) can be obtained. Further, a glass transition temperature can be also obtained by Differential Scanning Calorimetry (DSC) in compliance with JIS K7121, Testing Methods for Transition Temperatures of Plastics. Polyethylene terephthalate (PET) is a typical resin showing crystallization. Similar to the above-mentioned transparent resin film 3, a plasma treatment, a corona treatment may be applied to the surface of the protection film 1 to thereby increase the adhesive property to the adhesive agent layer 2, etc., on the protection film 1. Further, before the adhesive agent layer 2 is formed, the surface of the protection film 1 may be subjected to dust removing and cleaning by solvent cleaning, ultrasonic cleaning, etc., in accordance with needs.

<Adhesive Agent Layer 2>

For the adhesive agent layer 2, any compound having transparency can be used without limitation. Specifically, the one having, as a base polymer, an acrylic-based polymer, a silicone-based polymer, polyester, polyurethane, polyamide, polyvinyl ether, vinyl acetate/vinyl chloride copolymer, modified polyolefin, an epoxy-based polymer, a fluorine-based polymer, a rubber-based polymer such as natural rubber, synthetic rubber, can be appropriately selected and used. In particular, an acrylic-based adhesive agent is preferably used because it has a superior optical transparency, shows appropriate adhesive properties such as wettability, cohesivity, adhesiveness, etc., and is superior in weather resistance and thermal resistance, etc.

The method for forming the adhesive agent layer 2 is not particularly limited. The applicable methods include a method of coating an adhesive agent composition on a release liner, drying, and then, transferring on a substrate film (transfer method); a method of directly coating an adhesive agent composition on a protection film 1, and drying (direct application method); a co-extrusion method; and the like. Further, in accordance with needs, a tackiness agent, a plasticizer, a filler, an antioxidant, an ultraviolet absorber, a silane coupling agent, etc., may be added to the adhesive agent. A preferable thickness of the adhesive agent layer 2 is 5 to 50 µm.

<Transparent Conducting Film Laminate>

A transparent conducting film laminate comprises a transparent conducting film 20 or 30, and a carrier film 10 stacked on the transparent conducting film 20 or 30. The carrier film 10 is provided with a protection film 1, and an adhesive agent layer 2 located on one main face of the protection film 1. In case of the transparent conducting film 20, a transparent conducting layer 4 containing the metal nanowires and the binder resin, and an overcoat layer 5 are stacked, in this order, on one of the main faces of a transparent resin film 3. In case of the transparent conducting film 30, a transparent conducting layer 4 containing the metal nanowires and the binder resin, and an overcoat layer 5 are stacked, in this order, on both of the main faces of a transparent resin film 3. In case of the transparent conducting film 20, the carrier film 10 is releasably stacked on the transparent resin film 3 of the transparent conducting film 20 with the adhesive agent layer 2 therebetween. In case of the transparent conducting film 30, the carrier film 10 is releasably stacked on one of the overcoat layers 5 of the transparent conducting film 30 with the adhesive agent layer 2 therebetween.

When the transparent conducting film laminate of the above structure is cut to have a size of 15 cm*21 cm, and is subjected to heating at 100° C. for 30 minutes, a curl value immediately after the heating is preferably 0 to 25 mm, and a curl value after being cooled for 30 minutes is preferably 0 to 10 mm. Accordingly, generated amount and direction of the curl after the heating step for drying, etc., can be controlled, and thus, conveyance of the transparent conducting film laminate can become easy.

<Production Method and Processing Method of Transparent Conducting Film Laminate>

A method for producing a transparent conducting film laminate according to the first aspect comprises: a step of preparing a transparent conducting film 20 having a transparent resin film 3 which is provided, on one of the main faces thereof, with a transparent conducting layer 4 and an overcoat layer 5 stacked in this order; and a step of stacking a protection film 1 (carrier film 10), with an adhesive agent layer 2 therebetween, on the opposite (other) main face of the transparent conducting film 20, that is, the main face opposite to the main face on which the transparent conducting layer 4 is stacked.

A method for producing a transparent conducting film laminate according to the second aspect comprises: a step of preparing transparent conducting film 30 having a transparent resin film 3 which is provided, on both of the main faces thereof respectively, with a transparent conducting layer 4 and an overcoat layer 5 in this order; and a step of stacking a protection film 1, with an adhesive agent layer 2 therebetween, on one of the main faces (overcoat layer 5) of the transparent conducting film 30.

A method for processing the transparent conducting film laminate according to the present aspect comprises: a step of thermal-processing the transparent conducting film laminate; and a step of releasing the transparent carrier film 10 from the transparent conducting film 20 or 30 of the conducting film laminate. The thermal-processing step may be, for example, a step of forming a conductive pattern (wiring, electrode, etc.) by drying or thermosetting a conductive paste pattern (pattern of wiring, electrode, etc.) printed on the overcoat layer 5 of the transparent conducting film 20 or 30, with a conductive paste such as a silver paste, etc., so as to be electrically connected to the transparent conducting layer 4 constituting the transparent conducting film.

FIG. 3A to FIG. 3D show steps of a transparent conducting film laminate production method according to the first aspect. FIG. 4A to FIG. 4D show a modified example of steps of the transparent conducting film laminate production method according to the first aspect.

As shown in FIG. 3A to FIG. 3C, the step of preparing the transparent conducting film 20 includes forming a transparent conducting layer 4 on one of the main faces of the transparent resin film 3 (FIG. 3A, FIG. 3B), and subsequently forming an overcoat layer 5 on the transparent conducting layer 4 (FIG. 3C). Next, as shown in FIG. 3D, a step of releasably stacking a protection film 1 (carrier film 10) on the opposite (other) main face of the transparent conducting film 20, with an adhesive agent layer 2 therebetween, the opposite main face being the main face opposite to the main face on which the transparent conducting layer 4 is stacked, is performed, and thereby, a transparent conducting film laminate can be produced.

Further, as in the modified example shown in FIG. 4A to FIG. 4D, transparent conducting film laminate can be produced by a step of forming a transparent resin laminate having a transparent resin film 3 on one of the main faces of which a protection film 1 (carrier film 10) is releasably stacked with an adhesive agent layer 2 therebetween (FIG. 4A, FIG. 4B), forming a transparent conducting layer 4 on the opposite main face of the transparent resin film 3, the opposite main face being the main face opposite to (the other side of) the main face on which the carrier film 10 is stacked (FIG. 4C), and then, forming an overcoat layer 5 on the transparent conducting layer 4 (FIG. 4D).

FIG. 5A to FIG. 5G show steps of a method for producing a transparent conducting film laminate according to the second aspect. FIG. 6A to FIG. 6I show steps of a modified example of the method for producing the transparent conducting film laminate according to the second aspect.

As shown in FIG. 5A to FIG. 5F, the step of preparing the transparent conducting film 30 includes forming a transparent conducting layer 4 and an overcoat layer 5 in this order on one of the main faces of the transparent resin film 3 (FIG. 5A to FIG. 5C), and subsequently forming a transparent conducting layer 4 and an overcoat layer 5 in this order on the opposite (the other) main face of the transparent resin film 3 (FIG. 5D to FIG. 5F). Next, as shown in FIG. 5G, a step of releasably stacking a protection film 1 (carrier film 10) on the surface of one of the overcoat layers 5 of the transparent conducting film 30 with an adhesive agent layer 2, is performed, and thereby, a transparent conducting film laminate can be produced.

As the modified example shown in FIG. 6A to FIG. 6I, a transparent conducting film laminate can be also produced by steps that: while a transparent resin film 3 is provided, on one main face thereof, with the protection film 1 (carrier film 10) so as to be releasably stacked, with the adhesive agent layer 2 therebetween, a transparent conducting layer 4 and an overcoat layer 5 are stacked, in this order, on the opposite (the other) main face of the transparent resin film 3, the opposite main face being the main face opposite to the main face where the carrier film 10 is provided (FIG. 6A to FIG. 6D); thereafter, a protection film 1 (carrier film 10) is releasably stacked on the overcoat layer 5 with an adhesive agent layer 2 therebetween (FIG. 6E); then, release the carrier film 10 stacked on the transparent resin film 3 (FIG. 6F, FIG. 6G); and a transparent conducting layer 4 and an overcoat layer 5 are formed in this order, on the main face opposite to (on the other side of) the main face where the transparent conducting layer 4 is stacked, of the transparent resin film 3 (FIG. 6H, FIG. 6I).

Further, the conducting pattern can be obtained by, for example, patterning a transparent conducting layer 4 by etching, etc., and thereafter, drying and/or thermosetting a conductive paste pattern (pattern of wiring, electrode, etc.) formed by printing the conductive paste, by screen printing, etc., on the overcoat layer 5 located on the patterned transparent conducting layer 4 (transparent conducting pattern). In order to electrically connecting the transparent conducting pattern using silver nanowires, with the conductive paste pattern, a part (end of wire, intersection of wires having larger height) of silver nanowires should be exposed from the surface of the overcoat layer. The larger the number of exposed portions, the easier the electrical connection between the transparent conducting pattern using silver nanowires and the conductive paste pattern. Although depending on the shape (diameter, length) of the silver nanowire and the number of silver nanowires coated on the substrate, when the overcoat layer is thin, with the thickness of, for example, 500 nm or less, preferably 200 nm or less, and more preferably 100 nm or less, the number of exposed portions becomes sufficient for obtaining the electrical connection. When the overcoat layer is too thick to obtain electrical connection, the overcoat layer may be removed by a known etching technology to expose silver nanowires.

In the step of drying and/or thermosetting the conductive paste pattern, the heating temperature is preferably 100° C. or less, and more preferably 80° C. or less.

After the patterning of the transparent conducting layer 4, when the conducting pattern is formed using the conductive paste, position adjustment of the pattern-print of the conductive paste to the transparent conducting pattern is required, and thus, applying a sheet-feeding method is preferable. Here, for the position adjustment of the transparent conducting film laminate using the transparent conducting film 20 or 30, a step of fixing to an adsorption plate is required. However, when drying and/or thermosetting is performed within the above temperature range, the amount and direction of the curl can be controlled, and thus, drawbacks which may occur during the fixing step to the adsorption plate, etc., can be suppressed.

EXAMPLES

Hereinbelow, specific examples of the present disclosure will be specifically explained. The examples are described below for the purpose of easy understanding of the present disclosure, and the present disclosure is not limited to these examples.

Example 1

<Preparation of Transparent Conducting Film 20 Having Transparent Resin Film 3 Provided with on One Main Face Thereof with Transparent Conducting Layer 4>
<Preparation of Silver Nanowire>

Polyvinylpyrrolidone K-90 (manufactured by Nippon Shokubai Co., Ltd.) (0.98 g), $AgNO_3$ (1.04 g), and $FeCl_3$ (0.8 mg) were dissolved in ethylene glycol (250 ml), and subjected to thermal reaction at 150° C. for one hour. The obtained silver nanowire coarse dispersion liquid was dispersed in 2000 ml of methanol, which was poured into a desktop small tester (using ceramic membrane filter Cefilt, membrane area: 0.24 $m^2$, pore size: 2.0 μm, size Φ: 30 mm×250 mm, filter differential pressure: 0.01 MPa, manufactured by NGK Insulators, Ltd.), and was subjected to cross-flow filtration at a circulation flow rate of 12 L/min and a dispersion liquid temperature of 25° C., to remove impurities. Thereafter, the obtained dispersion liquid was condensed until the total amount became 100 g, to thereby obtain a methanol dispersion liquid of silver nanowires (average diameter: 26 nm, average length: 20 μm). The average diameter of the obtained silver nanowires was obtained by measuring diameters of arbitrarily selected 100 silver nanowires using Field Emission Scanning Electron Microscope JSM-7000F (manufactured by JEOL Ltd.), and calculating the arithmetic average value of the measurement results. Further, the average length of the obtained silver nanowires were obtained by measuring lengths of arbitrarily selected 100 silver nanowires using the Shape Measurement Laser Microscope VK-X200 (manufactured by Keyence Corporation), and calculating the arithmetic average value of the measurement results. For the methanol, ethylene glycol, $AgNO_3$, and $FeCl_3$, those manufactured by FUJIFILM Wako Pure Chemical Corporation were used.
<Preparation of Silver Nanowire Ink>

11 g of methanol dispersion liquid of silver nanowires synthesized by the above polyol method (silver nanowire concentration: 0.62% by mass), 3.5 g of water, 10.8 g of ethanol (manufactured by FUJIFILM Wako Pure Chemical Corporation), 12.8 g of propyleneglycol monomethyl ether (PGME, manufactured by FUJIFILM Wako Pure Chemical Corporation), 1.2 g of propylene glycol (PG, manufactured by AGC Inc.), and 0.7 g of PNVA (registered trademark) aqueous solution (solid content concentration: 10% by mass, weight-average molecular weight: 900,000, manufactured by Showa Denko K. K.) were mixed and stirred by Mix Rotor VMR-5R (manufactured by AS ONE Corporation) for 1 hour, at a room temperature and under an air atmosphere (rotation speed: 100 rpm), to thereby produce 40 g of silver nanowire ink as a conductive ink.

The silver concentration of the obtained silver nanowire ink was measured by AA280Z Zeeman atomic absorption spectrophotometer, manufactured by Varian, and the result was 0.17% by mass.

<Forming Transparent Conducting Layer (Silver Nanowire Layer) 4>

As a transparent resin film 3, a cyclo olefin polymer film ZF14-100 ((ZEONOR (registered trademark), glass transition temperature: 136° C. [catalog value], thickness $T_1$: 13 μm, manufactured by Zeon Corporation) of A4 size was subjected to plasma treatment (used gas: nitrogen, feed speed: 50 mm/sec, treatment time: 6 sec, set voltage: 400V) using a plasma processing equipment (AP-T03 manufactured by Sekisui Chemical Co., Ltd.). A silver nanowire ink was coated on the entire surface of the film (ZF14-100) (coating speed: 500 mm/sec), by using TQC Automatic Film Applicator Standard (manufactured by COTEC Corporation), and wireless bar OSP-CN-22L (bar shape/P (groove pitch): 500 μm, H (groove depth): 42 μm, material: SUS304, manufactured by COTEC Corporation). Thereafter, the coated film was subjected to hot-air drying at 80° C., for 1 minute, and under an air atmosphere, by using a constant temperature oven HISPEC HS350 (manufactured by Kusumoto Chemicals Ltd.), and thereby a silver nanowire layer having a thickness of 90 nm was obtained as a transparent conducting layer 4.

<Preparation of Overcoat Resin>

42.32 g of C-1015N (polycarbonate diol, molar ratio of raw material diols: 1,9-nonanediol:2-methyl-1,8-octanediol=15:85, molecular weight: 964, manufactured by Kuraray Co., Ltd.) as a polyol compound, 27.32 g of 2,2-dimethylol butanoic acid (manufactured by Huzhou Changsheng Chemical Co., Ltd.) as a dihydroxy compound containing a carboxy group, and 158 g of diethylene glycol monoethyl ether acetate (manufactured by Daicel Corporation) as a solvent were provided in a 2L three-neck flask having a stirrer, a thermometer, and a condenser, and the 2,2-dimethylol butanoic acid was dissolved at 90° C.

The temperature of the reaction liquid was lowered to 70° C., and 59.69 g of Desmodur (registered trademark)-W (bis(4-isocyanatocyclohexyl)methane), manufactured by Sumika Covestro Urethane Co., Ltd.) as polyisocyanate was dropped thereto for 30 minutes by a dropping funnel. After the dropping was complete, the temperature was raised to 120° C., and the reaction was performed at 120° C. for 6 hours. After the confirmation by IR that almost all of the isocyanate groups disappeared, 0.5 g of isobutanol was added, which was further reacted at 120° C. for 6 hours. The obtained carboxy group-containing polyurethane (overcoat resin) had a weight average molecular weight, obtained by GPC, of 32300, and a resin solution thereof had an acid value of 35.8 mgKOH/g.

<Preparation of Overcoat Ink>

10.0 g of above obtained (A) polyurethane containing a carboxy group solution (content of polyurethane containing a carboxy group: 45% by mass) was weighed in a polyethylene container, and 85.3 g of 1-hexanol and 85.2 g of ethyl acetate as (D) solvent were added thereto, which was stirred by Mix Rotor VMR-5R (manufactured by AS ONE Corporation) for 12 hours, at a room temperature and under an air atmosphere (rotation speed: 100 rpm). When the mixture was visually confirmed as being uniform, 0.63 g of pentaerythritol tetraglycidyl ether (manufactured by Showa Denko K. K.) as (B) epoxy compound and 0.31 g of U-CAT5003 (manufactured by San-Apro Ltd.) as (C) curing accelerator, were added thereto, which were stirred again by Mix Rotor for 1 hour. Thereby, an overcoat ink was obtained. The ratio of the curing accelerator, i.e., an aromatic ring-containing compound in the solid content of the overcoat ink was 5.7% by mass.

<Forming Overcoat Layer 5>

The overcoat ink was coated on the transparent conducting layer (silver nanowire layer) 4 formed on the transparent resin film 3, by using TQC Automatic Film Applicator Standard (manufactured by COTEC Corporation) (coating speed: 500 mm/sec). The coating was performed using the wireless bar OSP-CN-05M to have a wet film thickness of 5 μm, which was thereafter subjected to hot-air drying and thermosetting at 80° C., for 1 minute, and under an air atmosphere, by using a constant temperature oven HISPEC HS350 (manufactured by Kusumoto Chemicals Ltd.), and thereby an overcoat layer 5 (90 nm) was formed.

<Forming Carrier Film 10>

According to ordinary solution polymerization, at butyl acrylate/acrylic acid=100/6 (mass ratio), an acrylic-based polymer having a weight-average molecular weight of 600,000 was obtained. Then, 6 parts by mass of a epoxy-based cross-linking agent was added to 100 parts by mass of the acrylic-based polymer to prepare an acrylic-based adhesive agent. The acrylic-based adhesive agent was coated on a release-treated surface of a release-treated PET film, and heated at 120° C. for 60 seconds to thereby obtain an adhesive agent layer 2 having a thickness of 20 μm. Then, the release-treated PET film was adhered to one face of a PET film (protection film 1) having a thickness $T_2$ of 125 μm, with the adhesive agent layer 2 therebetween. Thereafter, the release-treated PET film was removed, and thereby, a carrier film 10 having the protection film 1 provided on one face thereof with the adhesive agent layer 2, was produced. The PET film used for the protection film 1 was subjected to Differential Scanning Calorimetry (DSC) using Differential Scanning Calorimeter DSC1 (manufactured by METTLER TOLEDO) in compliance with JIS K7121, Testing Methods for Transition Temperatures of Plastics, and as a result, the PET film had a peak at 194° C. due to crystallization, and a glass transition temperature (extrapolation glass transition starting temperature) of 72° C.

<Forming Transparent Conducting Film Laminate Having Transparent Resin Film 3 Provided on One Main Face Thereof with Transparent Conducting Layer 4>

Regarding the transparent conducting film 20 having the overcoat layer 5 and having the transparent resin film 3 provided with the transparent conducting layer (silver nanowire layer) 4, a carrier film 10 was provided, by pressure-bonding and stacking, on a face of the transparent resin film 3, with an adhesive agent layer 2 therebetween, the face being opposite to the face where the transparent conducting layer (silver nanowire layer) 4 was provided. Thereby, a transparent conducting film laminate was formed.

Example 2

Except that a cycloolefin polymer film RX4500 (ARTON (registered trademark), glass transition temperature: 132° C. [catalog value], thickness $T_1$: 15 μm, manufactured by JSR Corporation) was used as a transparent resin film 3 for producing the transparent conducting film 20, other conditions were the same as those of Example 1. The test result is shown in Table 1.

Example 3

Except that a cycloolefin polymer film ZF14-023 (ZEONOR (registered trademark), glass transition temperature: 136° C. [catalog value], thickness $T_1$: 23 μm, manufactured by Zeon Corporation) was used as a transparent resin film 3 for producing the transparent conducting film 20, other conditions were the same as those of Example 1. The test result is shown in Table 1.

Example 4

<Forming Conducting Film Laminate Having Transparent Resin Film 3 Provided on Each of Both Main Faces Thereof with Transparent Conducting Layer 4>

A transparent conducting layer (silver nanowire layer) 4 and an overcoat layer 5 were formed on one main face (first face) of the cycloolefin polymer film ZF14-013 under the same conditions as Example 1. Subsequently, a transparent conducting layer (silver nanowire layer) 4 and an overcoat layer 5 were formed on the other main face (second face) where the transparent conducting layer 4 was not formed under the same conditions as Example 1. Thereby, a transparent conducting film 30 having the transparent resin film 3 provided on each of both main faces thereof with the transparent conducting layer (silver nanowire) 4, was obtained. A carrier film 10 was pressure-bonded and stacked on the overcoat layer 5 of the first face of the transparent conducting film 30, with an adhesive layer 2 therebetween, to thereby form a transparent conducting film laminate. The test result is shown in Table 1.

Comparative Example 1

Except that a PET film having a thickness $T_2$ of 50 μm was used as a protection film 1 for producing the carrier film 10, other conditions were the same as those of Example 1. The test result is shown in Table 1.

Comparative Example 2

Except that a PET film having a thickness $T_2$ of 50 μm was used as a protection film 1 for producing the carrier film 10, other conditions were the same as those of Example 2. The test result is shown in Table 1.

Comparative Example 3

Except that a cycloolefin polymer film ZF14-050 (ZEONOR (registered trademark), glass transition temperature: 136° C. [catalog value], thickness $T_1$: 50 μm, manufactured by Zeon Corporation) was used as a transparent resin film 3 for producing the transparent conducting film 20, other conditions were the same as those of Example 1. The test result is shown in Table 1.

Comparative Example 4

Except that a cycloolefin polymer film ZF14-100 (ZEONOR (registered trademark), glass transition temperature: 136° C. [catalog value], thickness $T_1$: 100 μm, manufactured by Zeon Corporation) was used as a transparent resin film 3 for producing the transparent conducting film 20, other conditions were the same as those of Example 1. The test result is shown in Table 1.

Comparative Example 5

Except that a PET film having a thickness $T_2$ of 50 μm was used as a protection film 1 for producing the transparent conducting film 30, other conditions were the same as those of Example 4. The test result is shown in Table 1.

<Evaluation>

(1) Measurement of Thickness

The one having a thickness of 1 μm or more was measured by a micro-gauge thickness meter. Regarding the transparent conducting layer 4 having metal nanowires, and the overcoat layer 5, which has a thickness of less than 1 μm, the thickness was measured by a film thickness measurement system F20-UV (manufactured by Filmetrics Corporation), based on optical interferometry.

(2) Measurement of Curl Value

Each of the A4-size transparent conducting film laminates obtained by Examples and Comparative Examples is cut at substantially the center in the longitudinal direction to have a test piece of A5-size, i.e., 15 cm (in the major-side direction of the original A4-size)*21 cm (in the minor-side direction of the original A4-size). The test pieces were placed in a drier VO-420 (manufactured by Advantec) with a glass window on the front door, and heated with the overcoat layer 5 (in Example 4 and Comparative Example 5, refers to the overcoat layer 5 on which the protection film 1 was not stacked) facing upward, at 100° C. for 30 minutes.

During the heating, the uneven shape of each transparent conducting film laminate was observed through the glass window. When the heating was complete, the test piece was placed on a horizontal place with the overcoat layer 5 (in Example 4 and Comparative Example 5, refers to the overcoat layer 5 on which the protection film 1 was not stacked) facing upward, and the curl value was quickly measured by a ruler. This measurement value was treated as a curl value during heating. Further, the test piece was left to cool for 30 minutes at a room temperature, and the curl value was measured by a ruler. This value was treated as a curl value after being cooled.

Figures 7A, 7B:
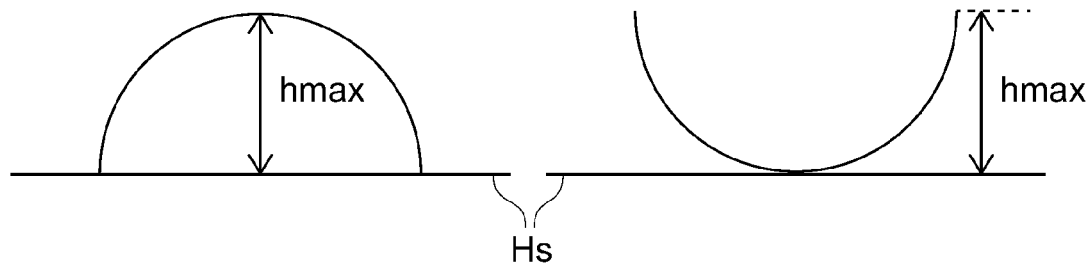
FIGS. 7A and 7B are explanatory views for a curl value measurement method according to examples.

FIG. 7A and FIG. 7B are explanatory views explaining a curl value measurement method. FIG. 7A explains the case when the transparent conducting film laminate is in a state of projecting curl, whereas FIG. 7B explains the case when the transparent conducting film laminate is in a state of recessed curl. In both cases, the height hmax of the highest point on the transparent conducting film laminate from the horizontal surface Hs on which the transparent conducting film laminate was placed, was measured and treated as the curl value.

The results are shown in Table 1. In Table 1, "flat" refers to a curl value of 5 mm or less, and "projection" or "recess" refers to a curl value exceeding 5 mm. Further, "projection" refers to the state that the center of the transparent conducting film laminate is projecting to the side of the overcoat layer 5 (in Example 4 and Comparative Example 5, refers to the overcoat layer 5 on which the protection film 1 was not stacked), whereas "recess" refers to the state that the center of the transparent conducting film laminate is projecting to the side of the protection film 1.

TABLE 1

| | Transparent Resin Film | | | Protection Film | | | | 100° C., 30 min. heating | | Curl Value During Heating [mm] | Curl Value After Cooled [mm] | Evaluation |
|---|---|---|---|---|---|---|---|---|---|---|---|---|
| | Material | Thickness $T_1$ [μm] | Tg [° C.] | Material | Thickness $T_2$ [μm] | Tg [° C.] | $T_2/T_1$ | During Heating | After Cooled | | | |
| Example 1 | ZF14-013 | 13 | 136 | PET | 125 | 72 | 9.6 | Flat | Flat | 1 | <1 | Excellent |
| Example 2 | RX4500 | 15 | 132 | PET | 125 | 72 | 8.3 | Flat | Flat | 1 | <1 | Excellent |
| Example 3 | ZF14-023 | 23 | 136 | PET | 125 | 72 | 5.4 | Projecting | Flat | 20 | <1 | Good |
| Example 4 | ZF14-013 | 13 | 136 | PET | 125 | 72 | 9.6 | Projecting | Recess | 10 | 10 | Good |
| Comparative Example 1 | ZF14-013 | 13 | 136 | PET | 50 | 72 | 3.9 | Projecting | Flat | 30 | <1 | Poor |
| Comparative Example 2 | RX4500 | 15 | 132 | PET | 50 | 72 | 3.3 | Projecting | Flat | 30 | <1 | Poor |
| Comparative Example 3 | ZF14-050 | 50 | 136 | PET | 125 | 72 | 2.5 | Projecting | Recess | 30 | 15 | Poor |
| Comparative Example 4 | ZF14-100 | 100 | 136 | PET | 125 | 72 | 1.3 | Projecting | Recess | 60 | 20 | Poor |
| Comparative Example 4 | ZF14-013 | 13 | 136 | PET | 50 | 72 | 3.9 | Projecting | Recess | 10 | 50 | Poor |

Regarding the transparent conducting film laminate of Example 1 and Example 2, both the curl value during heating and the curl value after cooled were less than 5 mm (Evaluation: Excellent). In Example 3, the curl value during heating was 20 mm, while the curl value after cooled was less than 5 mm (less than 1 mm) (Evaluation: Good). Therefore, in any of Example 1 to Example 3, deformation can be suppressed to the extent of preventing disadvantages in roll conveyance or other post processes. In Example 4 using the transparent conducting film 30 having the transparent resin film 3 provided on both faces thereof with the transparent conducting layer 4, both the curl value during heating and the curl value after cooled were small, i.e., 10 mm (Evaluation: Good), and deformation can be suppressed to the extent of preventing disadvantages in conveying rolls or other post processes.

On the other hand, regarding the transparent conducting film laminate according to Comparative Example 1 to Comparative Example 4, a projecting curl of 30 mm or more occurs during the heating, and the generated deformation was too much to perform roll conveyance and other post-processes (Evaluation: Poor). Further, in Comparative Example 3 and Comparative Example 4, after the film laminate was cooled, a large recessed curl remains, i.e., 15 mm (Comparative Example 3), and 20 mm (Comparative Example 4) (Evaluation: Poor). In Comparative Example 5 using the transparent conducting film 30 having the transparent resin film 3 provided on both faces thereof with the transparent conducting layer 4, a recessed curl of 50 mm remained after the film laminate was cooled (Evaluation: Poor). In Table 1, the criteria for determining evaluation "Excellent", "Good", and "Poor" are: "Excellent" applies to the case satisfying a curl value during heating of 5 mm or less, and a curl value after being cooled of 1 mm or less; "Good" refers to the case satisfying a curl value during heating of 25 mm or less, and a curl value after being cooled of 10 mm or less; and "Poor" refers to the case that a curl value during heating exceeds 25 mm and/or a curl value after being cooled exceeds 10 mm.

EXPLANATION ON NUMERALS 1 protection film
2 adhesive agent layer
3 transparent resin film
4 transparent conducting layer
5 overcoat layer
10 carrier film
20 transparent conducting film having transparent resin film provided on one main face thereof with transparent conducting layer
30 transparent conducting film having transparent resin film provided on each of both main faces thereof with transparent conducting layer

The invention claimed is:

1. A transparent conducting film laminate comprising a carrier film and a transparent conducting film stacked on the carrier film, wherein
   the carrier film comprises a protection film which is provided, on one of the main faces thereof, with an adhesive agent layer,
   the transparent conducting film comprises a transparent resin film which is provided, on one or both of the main faces thereof, with a transparent conducting layer containing metal nanowires and a binder resin, and an overcoat layer stacked in this order,
   the transparent resin film is made of an amorphous cycloolefin-based resin, and has a thickness $T_1$ of 5 to 25 μm,
   the transparent conducting film laminate is constituted by providing the transparent conducting film to be releasably stacked on the adhesive agent layer of the carrier film so that the overcoat layer becomes the outermost layer,
   the protection film is made of polyester having an aromatic ring in its molecular backbone, and
   the protection film has a thickness $T_2$ which is 5 times or more of the thickness $T_1$ of the transparent resin film, and is 150 μm or less.

2. A transparent conducting film laminate according to claim 1, wherein the transparent conducting layer containing the metal nanowires and the binder resin, and the overcoat layer are stacked, in this order, on one of the main faces of the transparent resin film.

3. A transparent conducting film laminate according to claim 1, wherein the transparent conducting layer containing the metal nanowires and the binder resin, and the overcoat layer are stacked, in this order, on each of the opposite main faces of the transparent resin film.

4. A transparent conducting film laminate according to claim 1, wherein the protection film is made of a polyethylene terephthalate-based resin.

5. A transparent conducting film laminate according to claim 1, wherein the metal nanowire contained in the transparent conducting layer is a silver nanowire.

6. A method for processing a transparent conducting film laminate comprising a step of thermal-processing the transparent conducting film laminate according to claim 1, and a step of releasing a carrier film from a transparent conducting film of the transparent conducting film laminate.

7. A method for processing a transparent conducting film laminate according to claim 6, wherein the thermal-processing step is a step of forming a conducting pattern by drying and/or thermosetting a conductive paste pattern formed on the overcoat layer with a conductive paste.

8. A method for producing a transparent conducting film laminate according to claim 3;
the method comprising:
a step of releasably stacking the transparent resin film on the carrier film with the adhesive agent layer therebetween,
a step of forming the transparent conducting layer and the overcoat layer, in this order, on a main face of the transparent resin film, the main face being opposite to the main face on which the carrier film is stacked,
a step of releasably stack the overcoat layer on the carrier film with the adhesive agent layer therebetween,
a step or releasing the carrier film stacked on the transparent resin film, and
a step of forming the transparent conducting layer and the overcoat layer, in this order, on a main face of the transparent resin film, the main face being opposite to the main face on which the transparent conducting layer is stacked.

9. A transparent conducting film laminate according to claim 1, wherein the protection film has a thickness $T_2$ which is 5.4 times or more of the thickness $T_1$ of the transparent resin film.

* * * * *